United States Patent
Kawasaki et al.

(10) Patent No.: US 6,898,054 B2
(45) Date of Patent: May 24, 2005

(54) CORROSION-RESISTANT SOFT MAGNETIC FILM, METHOD OF PRODUCING THE SAME, THIN FILM MAGNETIC HEAD USING THE SAME AND METHOD OF MANUFACTURING THE THIN FILM MAGNETIC HEAD

(75) Inventors: Mitsuo Kawasaki, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 495 days.

(21) Appl. No.: 09/867,825

(22) Filed: May 30, 2001

(65) Prior Publication Data

US 2002/0008936 A1 Jan. 24, 2002

(30) Foreign Application Priority Data

Jun. 1, 2000 (JP) ........................ 2000-169078
Apr. 13, 2001 (JP) ........................ 2001-114839

(51) Int. Cl.$^7$ ............................................. G11B 5/147
(52) U.S. Cl. ...................................................... 360/126
(58) Field of Search ............................. 360/125, 126, 360/317

(56) References Cited

U.S. PATENT DOCUMENTS 4,985,089 A * 1/1991 Yoshizawa et al. ......... 148/303

5,452,164 A * 9/1995 Cole et al. ................... 360/317

FOREIGN PATENT DOCUMENTS

| JP | 53-63211 | 6/1978 |
|----|----------|--------|
| JP | 57-152483 | 9/1982 |
| JP | 3-42806 | 2/1991 |
| JP | 05-005198 | 1/1993 |
| JP | 08-236349 | 9/1996 |
| JP | 10-3611 | 1/1998 |
| JP | 10-241125 | 9/1998 |
| JP | 11-8121 | 1/1999 |
| JP | 2001-6931 | 1/2001 |
| JP | 2001-76315 | 3/2001 |

\* cited by examiner

Primary Examiner—George Letscher
(74) Attorney, Agent, or Firm—Brinks Hofer Gilson & Lione

(57) ABSTRACT

A lower pole layer and/or an upper pole layer is formed by plating a soft magnetic film represented by the formula $Fe_xNi_Y\alpha_Z$ (wherein element α is at least one of Tc, Ru, Rh, Pd, Re, Os, Ir and Pt), wherein the composition ratio X of Fe is 65% by mass to 74% by mass, the composition ratio Y of Ni 25% by mass to 34% by mass, the composition ratio Z of the element α is 1% by mass to 7% by mass, and X+Y+Z= 100% by mass. Therefore, a thin film magnetic head adaptable to a higher recording density and having excellent corrosion resistance can be manufactured.

10 Claims, 9 Drawing Sheets

CORROSION-RESISTANT SOFT MAGNETIC FILM, METHOD OF PRODUCING THE SAME, THIN FILM MAGNETIC HEAD USING THE SAME AND METHOD OF MANUFACTURING THE THIN FILM MAGNETIC HEAD

BACKGROUND OF THE INVENTION

1. Field of the Invention

The present invention relates to a soft magnetic film comprising a FeNi alloy, and particularly to a soft magnetic film having both a high saturation magnetic flux density Bs and high corrosion resistance, a thin film magnetic head using the same, and a method of producing the soft magnetic film and a method of manufacturing the thin film magnetic head.

2. Description of the Related Art

A conventional soft magnetic film comprises a FeNi alloy having a Fe composition ratio of about 55% by mass and a Ni composition ratio of about 45% by mass, and having a saturation magnetic flux density Bs of about 1.6 T.

As shown in FIG. 1, such a soft magnetic film is used for a thin film magnetic head in which a recording head h2 comprises a lower core layer 7 and an upper core layer 10 each of which comprises a soft magnetic film, and which are opposed to each other with a coil layer 9 provided therebetween.

In the recording head h2, a recording magnetic field is induced in each of the upper core layer 10 and the lower core layer 7 by a coil current, and a recording signal is applied to a magnetic disk by a leakage magnetic field between the upper core layer 10 and the lower core layer 7. In order to increase the recording density, it is desirable to increase the saturation magnetic flux density Bs of the soft magnetic film which constitutes each of the upper core layer 10 and the lower core layer 7.

Although the saturation magnetic flux density of the soft magnetic film made of the FeNi alloy can be increased by increasing the Fe composition ratio, the soft magnetic film has a problem in which an increase in the Fe composition ratio deteriorates corrosion resistance.

Particularly, when the track of a thin film magnetic head is further narrowed accompanying increases in the recording density in the future, a pole layer having a high saturation magnetic flux density and excellent corrosion resistance must be formed in a very narrow region.

Therefore, the conventional NiFe alloy causes difficulties in manufacturing a thin film magnetic head adaptable to a higher recording density.

SUMMARY OF THE INVENTION

The present invention has been achieved for solving the above problem, and an object of the present invention is to provide a soft magnetic film having high corrosion resistance and a high saturation magnetic flux density.

Another object of the present invention is to provide a thin film magnetic head adaptable to a higher recording density and comprising a core layer and a pole layer each comprising a soft magnetic film having a high saturation magnetic flux density and excellent corrosion resistance even when the track width is narrowed.

A further object of the present invention is to provide a method of producing a soft magnetic film capable of easily forming, with high reproducibility, a soft magnetic film having a high saturation magnetic flux density and excellent corrosion resistance, and a method of manufacturing a thin film magnetic head using the soft magnetic film.

According to a first aspect of the present invention, there is provided a soft magnetic film comprising a FeNi alloy containing at least one element $\alpha$ selected from Tc, Ru, Rh, Pd, Re, Os, Ir and Pt, wherein the composition ratio of the element $\alpha$ is 1% by mass to 10% by mass.

The soft magnetic film is provided with magnetism by Ni and Fe, and the corrosion resistance can be improved by adding the element $\alpha$, as compared with a soft magnetic film not containing the element $\alpha$ and having an Fe composition ratio equivalent to the soft magnetic film of the present invention. With the composition ratio of element $\alpha$ of less than 1% by mass, a corrosion resistance improving effect cannot be obtained, while with the composition ratio of element $\alpha$ of over 10% by mass, a decrease in the Fe amount decreases the saturation magnetic flux density Bs and increases surface roughness, thereby deteriorating the corrosion resistance.

The soft magnetic film of the present invention has a Fe composition ratio of 55% by mass to 90% by mass, 72% by mass or more, or 68% by mass or more.

Such a soft magnetic film exhibits a significant improvement in corrosion resistance, as compared with a soft magnetic film not containing the element $\alpha$ and having an Fe composition ratio equivalent to the soft magnetic film of the present invention. The saturation magnetic flux density of the soft magnetic film can be increased by increasing the Fe composition ratio without deterioration in the corrosion resistance, as compared with a conventional soft magnetic film.

According to a second aspect of the present invention, there is provided a soft magnetic film represented by the composition formula $Fe_d Ni_e \alpha_f$ (wherein element $\alpha$ is at least one of Tc, Ru, Rh, Pd, Re, Os, Ir and Pt), wherein the composition ratio d of Fe is 58% by mass to 77% by mass, the composition ratio e of Ni 18% by mass to 37% by mass, the composition ratio f of the element $\alpha$ is 1% by mass to 12% by mass, and $d+e+f=100\%$ by mass.

In this soft magnetic film, the composition range of the element $\alpha$ is slightly wider than that of the soft magnetic film according to the first aspect of the present invention, while the Fe composition ratio lies in a narrower range than the soft magnetic film according to the first aspect of the present invention. With the soft magnetic film according to the second aspect of the present invention, both a high saturation magnetic flux density and excellent corrosion resistance can be appropriately achieved.

With this soft magnetic film, a high saturation magnetic flux density Bs, specifically, a saturation magnetic flux density Bs of 1.8 T or more, can be obtained, and excellent corrosion resistance can be improved to decrease the surface roughness of the film. The center line average roughness of the film surface can be suppressed to 10 nm or less.

The composition ratio of the element $\alpha$ of the soft magnetic film can be increased to 12% by mass by decreasing the Ni concentration of a plating bath composition. In the soft magnetic film according to the second aspect of the present invention, the center line average roughness Ra of the film surface can be suppressed to 10 nm or less even when up to about 12% by mass of the element $\alpha$ is added. However, with the composition ratio of element $\alpha$ of over this value, surface roughness becomes significant, and the saturation magnetic flux density Bs easily deteriorates due to a decrease in the Fe amount.

With the soft magnetic film according to the second aspect of the present invention, a saturation magnetic flux density Bs of about 1.8 T or more can be obtained, and both the high saturation magnetic flux density and corrosion resistance can be appropriately ensured. However, as a result of repeated experiment, the inventors succeeded in producing a preferred soft magnetic film according to a third aspect of the present invention as described below.

The soft magnetic film according to the third aspect of the present invention is represented by the formula $Fe_X Ni_Y \alpha_Z$ (wherein element $\alpha$ is at least one of Tc, Ru, Rh, Pd, Re, Os, Ir and Pt), wherein the composition ratio X of Fe is 65% by mass to 74% by mass, the composition ratio Y of Ni 25% by mass to 34% by mass, the composition ratio Z of the element $\alpha$ is 1% by mass to 7% by mass, and X+Y+Z=100% by mass.

In this soft magnetic film, the composition range of the soft magnetic film according to the second aspect of the present invention is further limited and optimized. In the soft magnetic film according to the third aspect of the present invention, a high saturation magnetic flux density, specifically, 1.9 T or more, can be obtained, and 2 T or more can be obtained according to the composition. Furthermore, the corrosion resistance can be improved to further decrease the surface roughness of the film. The center line average roughness of the surface of the soft magnetic film according to the third aspect of the present invention can be suppressed to 5 nm or less.

In the above-described soft magnetic films of the present invention, the element $\alpha$ is preferably Pd. It was found from the experiment described below that in a soft magnetic film of FeNiPd, properties such as a saturation magnetic flux density Bs, resistivity, etc., are equivalent to NiFe, and the corrosion resistance can be improved while maintaining these film properties.

In the above-described soft magnetic films of the present invention, the element $\alpha$ is preferably Rh. Like in the soft magnetic film containing Pd, in a soft magnetic film of FeNiRh, the corrosion resistance can be improved while maintaining good film properties such as a saturation magnetic flux density Bs, etc.

A thin film magnetic head of the present invention comprises a lower core layer made of a magnetic material, a gap layer formed on the lower core layer and made of an insulating material, a coil layer formed on the gap layer and made of a good conductive material, an insulating layer covering the coil layer, and an upper core layer formed on the insulating layer.

At least one of the upper core layer and the lower core layer comprises any one of the above-described soft magnetic films.

In the present invention, a lower pole layer is formed on the lower core layer to protrude from a surface facing a recording medium, and the lower pole layer preferably comprises any one of the above-described soft magnetic films.

A thin film magnetic film of the present invention may comprise a lower core layer, an upper core layer, and a pole portion located between the lower core layer and the upper core layer and having a width dimension in the track width direction, which is restricted to a narrower than the lower core layer and the upper core layer, wherein the pole portion comprises a lower pole layer continued from the lower core layer, an upper pole layer continued from the upper core layer, and a gap layer located between the lower pole layer and the upper pole layer, or the pole portion comprises an upper pole layer continued from the upper core layer and a gap layer located between the upper pole layer and the lower core layer, and the upper pole layer and/or the lower pole layer comprises any one of the above-described soft magnetic films.

In the present invention, the upper pole layer and/or the lower pole layer preferably comprises the soft magnetic film according to the third aspect of the present invention.

In the present invention, at least the portion of the core layer, which is adjacent to the magnetic gap, comprises at least two magnetic layers, or the pole layer comprises at least two magnetic layers, and the magnetic layer of the at least two magnetic layers, which contacts the magnetic gap, preferably comprises any one of the above-described soft magnetic films.

As described above, each of the soft magnetic films according to the first, second and third aspects of the present invention has a high saturation magnetic flux density Bs and excellent corrosion resistance to decrease the surface roughness of the film. By using such a soft magnetic film as a core material of a thin film magnetic head, the magnetic flux can be concentrated in the vicinity of the gap to promote an increase in the recording density. Furthermore, since the soft magnetic films have excellent corrosion resistance, the core layer and the pole layer can be prevented from being damaged by atmospheric humidity or a chemical gas used in the process of the thin film magnetic head. Since the core layer and the pole layer have high corrosion resistance, the thickness of a protecting film formed to cover the core layer and the pole layer may be decreased, whereby a recording magnetic field can be applied to a magnetic disk with the core layer and the pole layer being brought near the magnetic disk surface.

Particularly, in use of the soft magnetic film according to the third aspect of the present invention, which has a soft magnetic flux density of about 1.9 T or more and a center line average surface roughness of 5 nm or less, for the lower pole layer and/or the upper pole layer of the thin film magnetic head, a pole layer having a high saturation magnetic flux density Bs and excellent smoothness can be formed in a very narrow region with a narrow track. It is thus possible to manufacture a thin film magnetic head having excellent corrosion resistance and appropriately adaptable to a higher recording density in the future.

A method of producing the soft magnetic film according to the first aspect of the present invention comprises depositing a FeNi alloy containing Pd by an electroplating process, wherein the electroplating process uses a plating bath containing Fe and Ni ions, and further containing $PdCl_2$ which is added thereto in an amount of 0.01 g/l to 0.10 g/l based on the total amount of the plating bath.

In the method of producing the soft magnetic film, the FeNi alloy containing Pd can be deposited by using the plating bath containing $PdCl_2$ added thereto, and the Pd composition ratio is set to 1% by mass to 10% by mass to produce a soft magnetic film having high corrosion resistance.

The method of producing the soft magnetic film according to the first aspect of the present invention may comprise depositing a FeNi alloy containing Rh by an electroplating process, wherein the electroplating process uses a plating bath containing Fe and Ni ions, and further containing Rh which is added thereto by adding a strongly acidic Rh addition solution with a Rh content of 100 g/l in an amount of 0.1 g/l to 0.2 g/l based on the total amount of the plating bath.

In the method of producing the soft magnetic film, the FeNi alloy containing Rh can be deposited by using the plating bath containing the strongly acidic Rh addition solution added thereto, and the Rh composition ratio is set to 1% by mass to 10% by mass to produce a soft magnetic film having high corrosion resistance.

In the production method, the FeNi alloy containing Pd or the FeNi alloy containing Rh is preferably deposited by the electroplating process using a pulse current.

In the electroplating process using a pulse current, for example, a current control element is repeatedly turned ON and OFF to provide a time when the current is passed and a space time when the current is not passed during plating. In this way, by providing the time when the current is not passed, the FeNiPd or FeNiRh alloy film is slowly formed by plating, thereby relieving a deviation in the current density distribution during plating, as compared with an electroplating process using a DC current. The electroplating process using the pulse current facilitates control of the Fe content of the soft magnetic film, and can increase the Fe content of the film, as compared with the electroplating process using a DC current.

A method of producing the soft magnetic film according to the second aspect of the present invention comprises depositing a FeNi alloy by an electroplating process using a pulse current and a plating bath having a Fe ion concentration of 1.0 g/l to 10 g/l, a Ni ion concentration of 5 g/l to 40 g/l, and a concentration of element $\alpha$ (wherein element $\alpha$ is at least one of Tc, Ru, Rh, Pd, Re, Os, Ir and Pt) ion of 0.01 g/l to 0.2 g/l.

In this production method, the Ni ion concentration is limited to 5 g/l to 40 g/l. The Ni ion concentration is conventionally about 40 g/l, while in the present invention, the Ni ion concentration is set to a lower level than the conventional concentration, thereby decreasing the amount of Ni ions in the plating solution in contact with the surface of a cathode (the side to be plated). Therefore, the amounts of Fe and the element $\alpha$ contained in the FeNi alloy can be increased by improving an agitating effect, thereby easily forming a $Fe_d Ni_e \alpha_f$ with high reproducibility, in which the composition ratio d of Fe is 58% by mass to 77% by mass, the composition ratio e of Ni 18% by mass to 37% by mass, and the composition ratio f of the element $\alpha$ is 1% by mass to 12% by mass.

In the present invention, the Ni ion concentration is preferably set to 15 g/l or less, or 10 g/l or less.

Furthermore, the ion concentration of element $\alpha$ is preferably set to 0.01 g/l to 0.5 g/l.

In this way, the Ni ion concentration and the ion concentration of element $\alpha$ are further limited to permit the easy formation of the soft magnetic film according to the third aspect of the present invention, i.e., the $Fe_x Ni_y \alpha_z$ alloy film, with high reproducibility, in which the composition ratio X of Fe is 65% by mass to 74% by mass, the composition ratio Y of Ni is 25% by mass to 34% by mass, and the composition ratio Z of the element $\alpha$ is 7% by mass or less.

In the present invention, saccharin sodium is preferably further mixed with the plating bath for the FeNi alloy. The saccharin sodium ($C_6H_4CONNaSO_2$) has the function as a stress relaxing agent, and thus the membrane stress of the FeNi alloy film can be decreased by mixing the saccharin sodium.

In the present invention, 2-butyne-1,4-diol can be preferably further mixed with the plating bath. Therefore, coarsening of the crystal grains of the FeNi alloy formed by using this plating bath can be prevented to decrease the crystal grain diameter, thereby preventing the occurrence of gaps between respective crystal grains and roughening of the film surface. By preventing the surface roughening, the coercive force Hc can be decreased.

In the present invention, sodium 2-ethylhexyl sulfate is preferably mixed with the plating bath. Therefore, hydrogen produced in the plating bath can be removed by sodium 2-ethylhexyl sulfate serving as a surfactant to prevent surface roughening due to adhesion of hydrogen to the plating film.

Although sodium lauryl sulfate may be used in place of sodium 2-ethylhexyl sulfate, sodium 2-ethylhexyl sulfate is preferably used because bubbles less occur in mixing with the plating solution, and thus a large amount of sodium 2-ethylhexyl sulfate can be mixed with the plating solution to appropriately remove the hydrogen.

A method of manufacturing a thin film magnetic head of the present invention comprises depositing a lower core layer made of a magnetic material, an upper core layer opposed to the lower core layer through a magnetic gap at the surface facing a recording medium, and a coil layer for inducing a recording magnetic field in both core layers, wherein at least one of the core layers comprises a soft magnetic film produced by plating by any one of the above-described production methods.

In the present invention, a lower pole layer is formed on the lower core layer to protrude from the surface facing the recording medium, and the lower pole layer preferably comprises any one of the above soft magnetic films.

A method of manufacturing a thin film magnetic head of the present invention comprises depositing a lower core layer, an upper core layer, and a pole portion between the lower core layer and the upper core layer so that the width dimension in the track width direction is limited to a narrower range than the lower core layer and the upper core layer, wherein the pole portion comprises a lower pole layer continued from the lower core layer, an upper pole layer continued from the upper core layer, and a gap layer located between the lower pole layer and the upper pole layer, or the pole portion comprises an upper pole layer continued from the upper core layer, and a gap layer located between the upper pole layer and the lower core layer.

In the manufacturing method, the upper pole layer and/or the lower pole layer comprises a soft magnetic film formed by plating by any one of the above-described production methods.

The upper pole layer and/or the lower pole layer is preferably formed by plating by the method of producing the soft magnetic film according to the third aspect of the present invention.

Furthermore, at least the portion of the core layer, which is adjacent to the magnetic gap, preferably comprises at least two magnetic layers, or the pole layer preferably comprises at least two layers, and the magnetic layer of the at least two magnetic layers, which contacts the magnetic gap, preferably comprises the soft magnetic film formed by plating.

Each of the core layer and the pole layer, which constitute the thin film magnetic head, comprises a soft magnetic film formed by plating by any one of the above-described production methods, and thus the core layer and the pole layer have a high saturation magnetic flux density Bs, thereby permitting an attempt to increase the recording density. It is also possible to manufacture a thin film magnetic head having excellent corrosion resistance with high yield.

Furthermore, the agitating effect can be improved by increasing the Ni ion concentration of the plating bath to increase the movement (substitution) of Fe ions and element α ions to the surface to be plated during the formation of a soft magnetic film in such a narrow region as the pole layer by plating. Therefore, a soft magnetic film having a high saturation magnetic flux density Bs and excellent smoothness can be formed by plating in a narrow region with high reproducibility, as compared with a conventional soft magnetic film.

DESCRIPTION OF THE PREFERRED EMBODIMENTS

Figure 1:
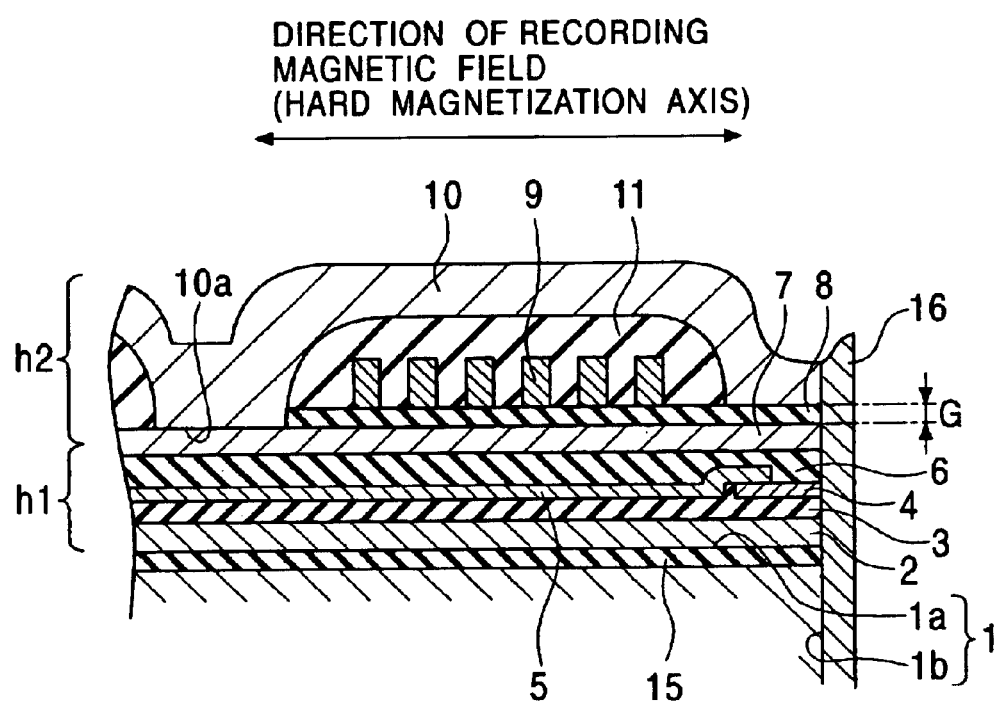
FIG. 1 is a longitudinal sectional view of a thin film magnetic head according to an embodiment of the present invention.

A soft magnet film according to a first embodiment of the present invention comprises a FeNi alloy containing at least one element α of Tc, Ru, Rh, Pd, Re, Os, Ir, and Pt, wherein the composition ratio of the element α is 1% by mass to 10% by mass.

In the present invention, element α, which is a noble metal such as Pd, is added to the NiFe alloy to form a film which has improved corrosion resistance and which is less ionized even by exposure to a solvent. However, with an excessively large amount of the element α added, the saturation magnetic flux density Bs deteriorates due to a decrease in the Fe amount, and the surface of the film is extensively roughened, thereby failing to effectively improve the corrosion resistance.

In the present invention, on the basis of the experimental results which will be described below, the composition ratio of the element α is set in the range of 1% by mass to 10% by mass.

In the soft magnetic film of the first embodiment, the composition ratio of the element α is preferably 1.58% by mass to 4.90% by mass.

The Fe amount contributes to the saturation magnetic flux density Bs, and the saturation magnetic flux density Bs can be increased by increasing the Fe amount. However, with an excessively large amount of Fe, the surface of the film is extensively roughened to decrease the corrosion resistance, and the saturation magnetic flux density Bs is also decreased.

In the soft magnetic film of the first embodiment, the composition ratio of Fe is preferably 55% by mass to 90% by mass, more preferably 72% by mass or more or 68% by mass or more.

As a result, a saturation magnetic flux density Bs of 1.5 T or more, preferably 1.8 T or more, can be ensured.

Specifically, in the soft magnetic film of the first embodiment, the composition ratios are set as follows:

The composition ratio of Fe is about 51 to 74% by mass, the composition ratio of Ni is about 24 to 46% by mass, the composition ratio of Pd is 1.4 to 4.9% by mass, and the total of the composition ratios of Fe, Ni and Pd is 100% by mass.

As a result of comparison of the properties of the FeNiPd alloy having the composition ratios in the above ranges and the properties of a FeNi alloy not containing Pd, the results described below were obtained. The results were obtained by comparison of a FeNiPd alloy film and a FeNi alloy film each having a thickness of about 2 μm.

In the case of $Fe_aNi_bPd_{100-a-b}$, with a Fe composition ratio (=a) of 51 to 53% by mass, the corrosion resistance is improved with increases in the Pd composition ratio (=100-a-b), and particularly with a Pd composition ratio of 4.0% by mass or more, the corrosion resistance is significantly improved, as compared with a conventional soft magnetic film ($Fe_{55}Ni_{45}$) not containing Pd and having a Fe composition ratio of about 55% by mass.

In the $Fe_aNi_bPd_{100-a-b}$ (a=51 to 53), the characteristics of the film such as the saturation magnetic flux density Bs, coercive force, anisotropic magnetic field, resistivity, stress, etc. are less affected by the Pd composition ratio (100-a-b), and maintained in substantially equivalent levels to a soft magnetic film ($Fe_aNi_{100-a}$) not containing Pd and having an Fe composition ratio (=a) equivalent to the $Fe_aNi_bPd_{100-a-b}$.

In the $Fe_aNi_bPd_{100-a-b}$, with a Fe composition ratio (=a) of about 72% by mass, and a Pd composition ratio (=100-a-b) of about 3.5% by mass, the corrosion resistance is significantly improved, as compared with a soft magnetic film ($Fe_{72}Ni_{28}$) not containing Pd and having a Fe composition ratio of about 72% by mass, and the corrosion resistance is higher than that of the conventional soft magnetic film ($Fe_{55}Ni_{45}$) not containing Pd and having a Fe composition ratio of about 55% by mass, In the $Fe_aNi_bPd_{100-a-b}$, with a Fe composition ratio (=a) of over about 72% by mass, and a Pd composition ratio (=100-a-b) of about 2% by mass, the corrosion resistance is significantly improved, as compared with the soft magnetic film ($Fe_{72}Ni_{28}$) not containing Pd and having a Fe composition ratio of about 72% by mass, and the corrosion resistance is substantially the same as that of the conventional soft magnetic film ($Fe_{55}Ni_{45}$) not containing Pd and having a Fe composition ratio of about 55% by mass, In the $Fe_aNi_bPd_{100-a-b}$ (a≧72), the saturation magnetic flux density Bs and resistivity are less affected by the Pd composition ratio (100-a-b), and the saturation magnetic flux density Bs is as high as about 1.9 T and maintained in a substantially equivalent level to the soft magnetic film ($Fe_aNi_{100-a}$) not containing Pd and having an Fe composition ratio (=a) equivalent to $Fe_aNi_bPd_{100-a-b}$.

As described above, the $Fe_aNi_bPd_{100-a-b}$ film has improved corrosion resistance, as compared with the ($Fe_aNi_{100-a}$) film not containing Pd and having an Fe composition ratio (=a) equivalent to the $Fe_aNi_bPd_{100-a-b}$ film.

Where the Pd composition ratio of $Fe_aNi_bPd_{100-a-b}$ having a high Fe composition ratio equals to the Pd composition ratio of $Fe_{a'}Ni_{b'}Pd_{100-a'-b'}$ having a low Fe composition ratio (100-a-b=100-a'-b'), $Fe_aNi_bPd_{100-a-b}$ having a high Fe composition ratio significantly exhibits the effect of improving the corrosion resistance by adding Pd.

Next, another example of the soft magnetic film according to the first embodiment of the present invention will be described.

The soft magnetic film of the first embodiment of the present invention comprises the FeNi alloy film having a thickness of about 2 μm, and is represented by the composition formula $Fe_{75}Ni_{16}Rh_9$ having a Fe composition ratio of about 75% by mass, a Ni composition ratio of about 16% by mass, and a Rh composition ratio of about 9% by mass.

The corrosion resistance of the $Fe_{75}Ni_{16}Rh_9$ film is improved, as compared with a soft magnetic film ($Fe_{72}Ni_{28}$) not containing Rh and having a Fe composition ratio of about 72% by mass, and is equivalent to a FeNiPd film having a Fe composition of about 72% by mass and a Pd composition ratio of about 3.5% by mass.

The composition ratios of a soft magnetic film according to a second embodiment of the present invention will be described below.

The soft magnet film according to the second embodiment of the present invention is represented by the composition formula $Fe_dNi_e\alpha_f$ (wherein element α is at least one of Tc, Ru, Rh, Pd, Re, Os, Ir, and Pt) wherein the composition ratio d of Fe is 58% by mass to 77% by mass, the composition ratio e of Ni is 18% by mass to 37% by mass, the composition ratio f of the element α is 1% by mass to 12% by mass, and d+e+f=100% by mass.

In the soft magnetic film of the second embodiment, element α, which is a noble metal such as Pd, is added to a NiFe alloy to improve the corrosion resistance of the FeNiα alloy, as compared with a NiFe alloy not containing the element α.

In the soft magnetic film according to the first embodiment, the composition ratio of the element α is limited in the range of 1% by mass to 10% by mass, while in the soft magnetic film according to the second embodiment, the composition ratio of the element α is 1% by mass to 12% by mass.

Namely, the composition range of the element α of the soft magnetic film according to the second embodiment can be widened, as compared with the soft magnetic film according to the first embodiment. The reason why the composition ratio of the element α can be widened is that the Ni ion concentration of the plating bath used in the production method is decreased to improve the agitating effect. The production method will be described in further detail below.

The reason for setting the upper limit of the element α is 12% by mass is that with a composition ratio of the element α of over this value, the surface of the film is significantly roughened to deteriorate the corrosion resistance, and the saturation magnetic flux density Bs is easily decreased due to a decrease in the Fe amount.

The Fe composition ratio and the Ni composition ratio of the soft magnetic film of the second embodiment are limited to narrower ranges than the soft magnetic film of the first embodiment. The Fe amount is important for improving the saturation magnetic flux density Bs, and the saturation magnetic flux density Bs can be increased by increasing the Fe amount. However, with a Fe amount of over 77% by mass, the surface of the film is significantly roughened to deteriorate the corrosion resistance and decrease the saturation magnetic flux density Bs. On the other hand, with a Fe amount of less than 58% by mass, the corrosion resistance is good, while the saturation magnetic flux density Bs is easily decreased.

With the soft magnetic film having the composition ratios in the above ranges, a soft magnetic flux density Bs of 1.8 T or more can be ensured. Also, the corrosion resistance can be improved, and the surface roughness of the film can be decreased. Specifically, the center line average roughness Ra of the film surface can be suppressed to 10 nm or less.

In the soft magnetic film of the second embodiment, the coercive force Hc can be decreased to, for example, 500 (A/m) or less. Also, a resistivity of 30 (μω/cm) or more can be obtained, and an anisotropic magnetic field Hk equivalent to a NiFe alloy can be obtained.

The composition ratios of a soft magnetic film according to a third embodiment of the present invention will be described below.

The soft magnet film according to the third embodiment of the present invention is represented by the composition formula $Fe_XNi_Y\alpha_Z$ (wherein element α is at least one of Tc, Ru, Rh, Pd, Re, Os, Ir, and Pt) wherein the composition ratio X of Fe is 65% by mass to 74% by mass, the composition ratio Y of Ni is 25% by mass to 34% by mass, the composition ratio Z of the element α is 1% by mass to 7% by mass, and X+Y+Z=100% by mass.

The composition ratios of the soft magnetic film of the third embodiment are further limited and optimized, as compared with the soft magnetic film of the second embodiment.

With the soft magnetic film of the third embodiment, a higher soft magnetic flux density Bs than the soft magnetic films of the first and second embodiments can be obtained. Specifically, a saturation magnetic flux density Bs of 1.9 T or more can be obtained, and 2.0 T or more can be obtained according to the composition. Also, the surface roughness of the film can be decreased, as compared with the soft magnetic film of the second embodiment. Specifically, the center line average roughness Ra of the film surface can be suppressed to 5 nm or less.

Any of the soft magnetic films of the first, second and third embodiments can be used as a core material for a thin film magnetic head which will be described below.

A thin film magnetic head used for a hard magnetic disk device or the like is a combination type thin film magnetic head comprising a reproducing head h1 and a recording head h2 (inductive head), for example, as shown in FIG. 1. The reproducing head h1 is formed on an end surface 1a of a slider 1 with an underlying layer 15 provided therebetween and made of alumina or the like. The reproducing head h1 comprises a lower shield layer 2 made of a FeNi alloy, a lower gap layer 3 made of alumina and formed to cover the lower shield layer 2, a magnetoresistive element 4 formed on the lower gap layer 3 and employing an anisotropic magnetoresistive (AMR effect) effect, a giant magnetoresistive effect (GMR effect), or a tunnel-type magnetoresistive effect (TMR effect), an electrode layer 5 electrically connected to the magnetoresistive element 4, an upper gap layer 6 made of alumina and formed to cover the magnetoresistive element 4 and the electrode layer 5, and an upper shield layer 7 formed on the upper gap layer 6.

The recording head h2 provided on the reproducing head h1 comprises a lower core layer 7 which is also used as the upper shield layer 7 of the reproducing head h1 and which comprises a soft magnetic film made of a FeNi alloy containing at least one element α of Tc, Ru, Rh, Pd, Re, Os, Ir, and Pt, a gap layer 8 made of a magnetic material such as alumina, $SiO_2$, or the like and formed on the lower core layer 7, a coil layer 9 made of a good conductor such as Cu or the like and patterned on the gap layer 8, and an upper core layer 10 formed on the coil layer 9 with an insulating layer 11 of resist coated therebetween. Like the lower core layer 7, the upper core layer 10 comprises a soft magnetic film made of a FeNi alloy containing at least one element α of Tc, Ru, Rh, Pd, Re, Os, Ir, and Pt. The base end 10a of the upper core layer 10 is electrically connected to the lower core layer also serving as the upper shield layer 7, and the gap between the lower core layer 7 and the upper core layer 10 with the gap layer 8 held therebetween is referred to as "writing gap G" on the side 1b facing a magnetic disk.

In the thin film magnetic head, a protecting film 16 made of carbon is formed on the magnetic disk-facing side 1b to cover the upper core layer 10 and the lower core layer 7.

Next, driving of the thin film magnetic head of the present invention will be described.

During driving of the thin film magnetic head, a recording current is applied to the coil layer 9 to induce a recording magnetic field in the upper core layer 10 and the lower core layer 7. Since the recording magnetic field is oriented in the direction of the hard magnetization axis of the upper core layer 10 and the lower core layer 7, the upper core layer 10 and the lower core layer 7 have magnetic properties in the hard magnetization direction of a soft magnetic film.

The recording magnetic field induced in the upper core layer 10 and the lower core layer 7 produces a leakage magnetic field in the writing gap G to apply a recording magnetic field to the recording medium by the leakage magnetic field.

In this thin film magnetic head, each of the upper core layer 10 and the lower core layer 7 has a high saturation magnetic flux density Bs, making the thin film magnetic head adaptable to a higher recording density. Although the resistivity of the upper core layer 10 and the lower core layer 7 must be increased to suppress an eddy current loss in order to cope with a higher recording frequency, the resistivity of the upper core layer 10 and the lower core layer 7 is maintained in a conventional level, and a high recording frequency characteristic can be maintained.

Each of the upper core layer 10 and the lower core layer 7 comprises any one of the soft magnetic films of the first, second and third embodiments.

Particularly, each of the upper core layer 10 and the lower core layer 7 preferably comprises the soft magnetic film of the second or third embodiment. By using the soft magnetic film of the second embodiment, a core layer can be obtained, in which a saturation magnetic flux density Bs of 1.8 T or more can be obtained, and the center line average roughness Ra of the film can be suppressed to 10 nm or less.

With the soft magnetic film of the third embodiment, a core layer can be obtained, in which a saturation magnetic flux density Bs of 1.9 T or more can be obtained, and the center line average roughness Ra of the film can be suppressed to 5 nm or less.

Therefore, a magnetic flux can be concentrated in the vicinity of the gap between the core layers to improve the recording density, and a thin film magnetic head adaptable to a higher recording density can be manufactured. The thin film magnetic head has excellent corrosion resistance and can appropriately prevent corrosion even when exposed to various solvents used in the manufacturing process.

Since the upper core layer 10 and the lower core layer 7 have high corrosion resistance, the protecting layer 16 for covering the upper and lower core layers may be thinned so that a recording magnetic field can be applied to the magnetic disk with the upper and lower core layers being brought near the magnetic disk surface.

Although the combination type thin film magnetic head has been described above, the thin film magnetic head of the present invention may be a record-only thin film magnetic head comprising only a recording head. Although, in the above-described thin film magnetic head, both the upper core layer and the lower core layer comprise the soft magnetic films of the present invention, either of the upper core layer and the lower core layer may comprise the soft magnetic film of the present invention.

In the present invention, the soft magnetic films of the first, second and third embodiments can be used for a thin film magnetic head having a structure other than that shown in FIG. 1. The structures of other thin film magnetic heads will be described below.

Figure 2:
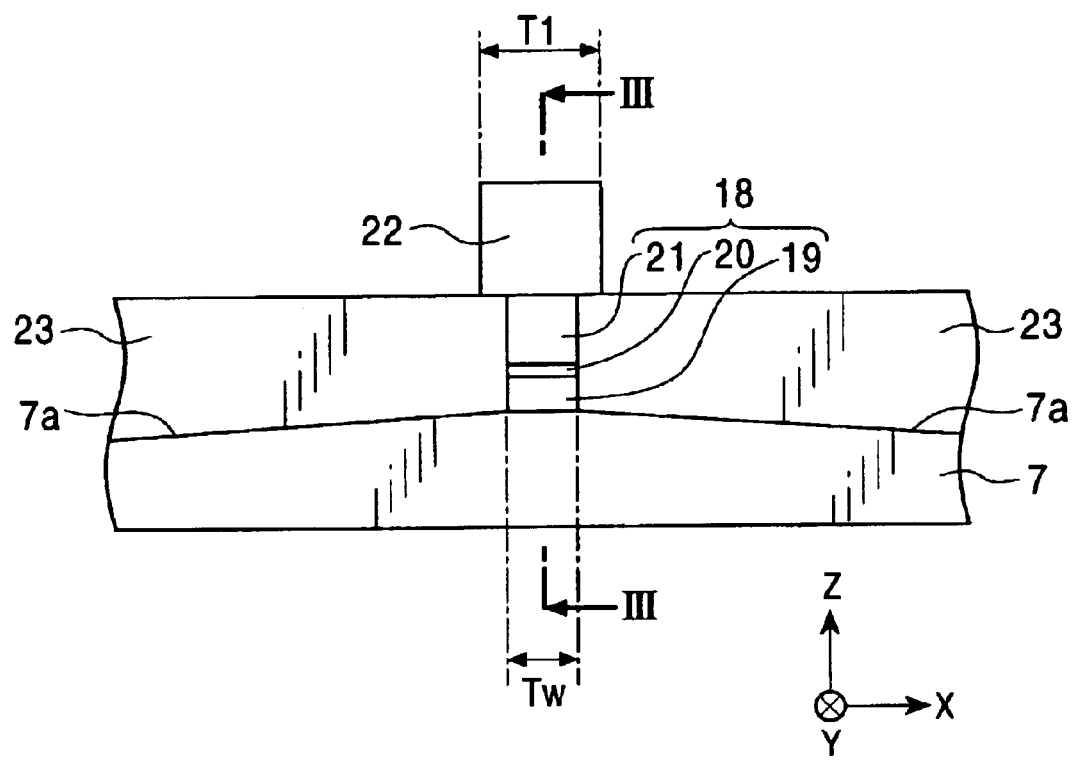
FIG. 2 is a partial front view of a thin film magnetic head according to another embodiment of the present invention.
Figure 3:
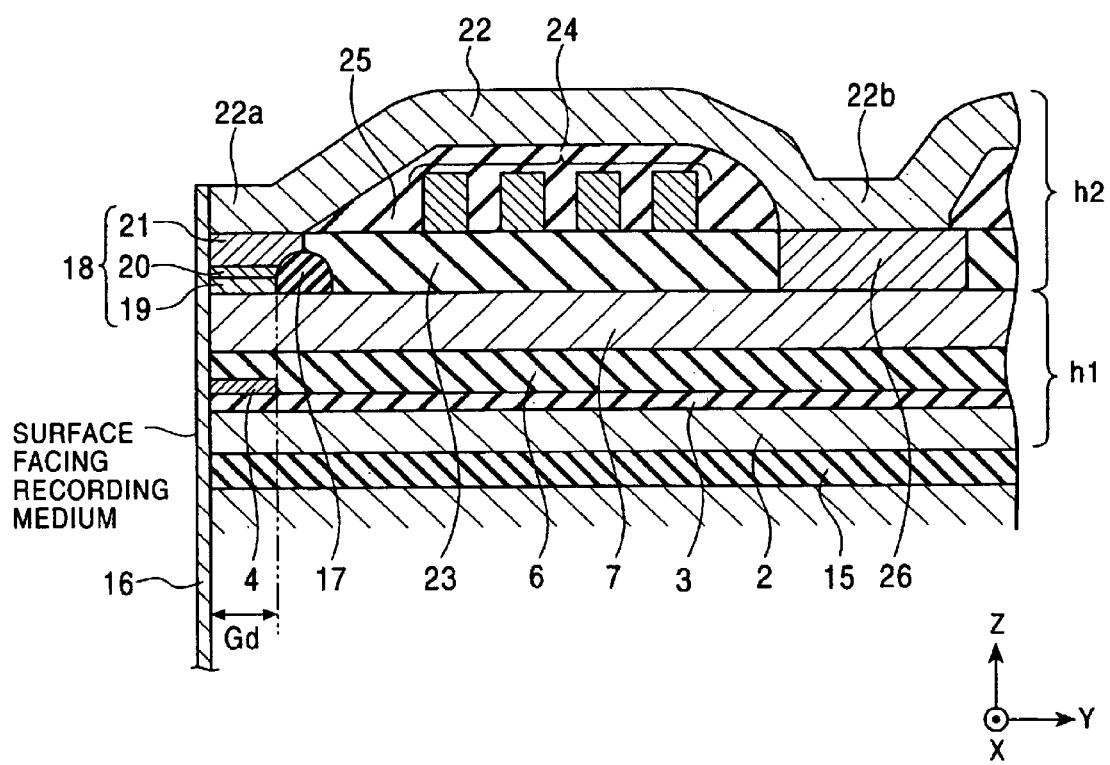
FIG. 3 is a longitudinal sectional view of the thin film magnetic head shown in FIG. 2.

FIG. 2 is a partial front view of a thin film magnetic head according to another embodiment of the present invention, and FIG. 3 is a longitudinal partial sectional view showing the thin film magnetic head taken along line III—III in FIG. 2, as viewed from the direction of arrows.

The structure of the reproducing head h1 is the same as FIG. 1. Like in FIG. 1, in the embodiment shown in FIGS. 2 and 3, the upper shield layer 7 is also used as a lower core layer of an inductive head h2. In FIGS. 2 and 3, a Gd determining layer 17 is formed on the lower core layer 7 so that the length dimension from the surface facing the recording medium to the front end of the Gd determining layer 17 is regulated by the gap depth (Gd). The Gd determining layer 17 comprises, for example, an organic insulating material.

As shown in FIG. 2, the upper surface 7a of the lower core layer 7 is formed to be inclined toward the lower surface in the track width direction (the X direction shown in the drawing) away from the base end of a pole portion 18, thereby suppressing the occurrence of side fringing.

As shown in FIG. 3, the pole portion 18 is formed to extend from the surface facing the recording medium to the top of the Gd determining layer 17.

The pole portion 18 comprises a lower pole layer 19, a nonmagnetic gap layer 20, and an upper pole layer 21, which are laminated in turn from the bottom.

The lower pole layer 19 is formed directly on the lower core layer 7 by a plating process. The gap layer 20 formed on the lower pole layer 19 is preferably made of a nonmagnetic metal material which can be plated. Specifically, at least one material is preferably selected from NiP, NiPd, NiW, NiMo, Au, Pt, Rh, Pd, Ru, and Cr.

In the present invention, for example, NiP is used for the gap layer 20. This is because the gap layer 20 can be appropriately made nonmagnetic by using NiP for the gap layer 20.

The upper pole layer 21 formed on the gap layer 20 is magnetically connected to an upper core layer 22 formed thereon.

As described above, with the gap layer made of a nonmagnetic metal material which can be plated, the lower pole layer 19, the gap layer 20 and the upper pole layer 21 can be continuously formed by plating.

The pole portion 18 may comprise two layers including the gap layer and the upper pole layer 21.

As shown in FIG. 2, the pole portion 18 is formed with a width dimension corresponding to a track width Tw in the track width direction (the X direction shown in the drawing).

As shown in FIGS. 2 and 3, insulating layers 23 made of, for example, an inorganic insulating material are formed on both sides of the pole portion 18 in the track width direction (the X direction) and in the portion behind the pole portion 18 in the height direction (the Y direction shown in the drawings). The upper surfaces of the insulating layers 23 and the upper surface of the pole portion 18 lie in the same plane.

As shown in FIG. 3, a coil layer 24 is spirally patterned on the insulating layers 23. The coil layer 24 is covered with an insulating layer 25 made of an organic insulating material. The coil layer 24 may comprise at least two layers which are laminated with an insulating layer provided therebetween.

As shown in FIG. 3, the upper core layer 22 is patterned by, for example, a frame plating method to extend from the pole portion 18 to the insulating layer 25. As shown in FIG. 2, the front end 22a of the upper core layer 22 is formed with the width dimension T1 in the track width direction at the surface facing the recording medium, the width dimension T1 being larger than the track width Tw.

As shown in FIG. 3, the base end 22b of the upper core layer 22 is connected directly to the top of a connecting layer (back gap layer) formed on the lower core layer 7 and made of a magnetic material.

In the present invention, the upper pole layer 21 and/or the lower pole layer 19 comprises any one of the soft magnetic films of the first, second and third embodiments.

All the soft magnetic films contain at least one element α of Tc, Ru, Rh, Pd, Re, Os, Ir, and Pt, and have excellent corrosion resistance, as compared with a NiFe alloy not containing the element α. Also, the soft magnetic films have excellent film characteristics such as the saturation magnetic flux density Bs, and thus the use of the FeNiα alloy for the pole layer permits concentration of a magnetic flux near the gap of the pole layer, thereby improving the recording density.

A thin film magnetic head having a structure adaptable to a narrower track is required as the recording density increases in future.

In the thin film magnetic head shown in FIGS. 2 and 3, the pole portion 18 having the track width Tw is formed between the lower core layer 7 and the upper core layer 22 separately from the core layers. The structure of the thin film magnetic head shown in FIGS. 2 and 3 is more appropriately adaptable to a narrower tack as compared with the structure shown in FIG. 1 in which the upper core layer 10 is opposed to the lower core layer 7 with the gap layer 8 provided therebetween.

The pole portion 18 preferably has a width dimension of about 0.1 to 0.5 μm in the track width direction (the X direction), a depth dimension (the Y direction) of the same as the width dimension, and a height dimension (the Z direction) of about 2 to 5 times the width dimension.

The lower pole layer 19 and the upper pole layer 21 which constitute the pole portion 18 formed in such a narrow space are required to have a high saturation magnetic flux density Bs and preferably have lower surface roughness. In the thin film magnetic head shown in FIG. 1, the upper core layer 10 and the lower core layer 7 are formed in a relative wide region, and thus surface roughness causes no problem. However, in the thin film magnetic head shown in FIG. 2, the surface roughness makes it impossible to form the pole layers 19 and 21 having predetermined shapes and excellent corrosion resistance in a very narrow region.

Therefore, in the thin film magnetic head comprising the pole portion 18 formed with the track width Tw between the lower core layer 7 and the upper core layer 22, as shown in FIG. 2 and 3, the upper pole layer 21 and/or the lower pole layer 19 preferably comprises the soft magnetic film according to the third embodiment.

Namely, the upper pole layer 21 and/or the lower pole layer 19 preferably comprises the soft magnetic film represented by the composition formula $Fe_xNi_y\alpha_z$ (wherein element α is at least one of Tc, Ru, Rh, Pd, Re, Os, Ir, and Pt) wherein the composition ratio X of Fe is 65% by mass to 74% by mass, the composition ratio Y of Ni is 25% by mass to 34% by mass, the composition ratio Z of the element α is 1% by mass to 7% by mass, and X+Y+Z=100% by mass.

The soft magnetic film of the third embodiment has a saturation magnetic flux density Bs of 1.9 T or more, and a center line average surface roughness Ra of 5 nm or less. Therefore, by using the soft magnetic film of the third embodiment for the lower pole layer 19 and the upper pole layer 21 shown in FIG. 3, the advantage of track narrowing can be effectively ensured, and a thin film magnetic head appropriately adaptable to a higher recording density and having excellent corrosion resistance can be manufactured.

Figure 4:
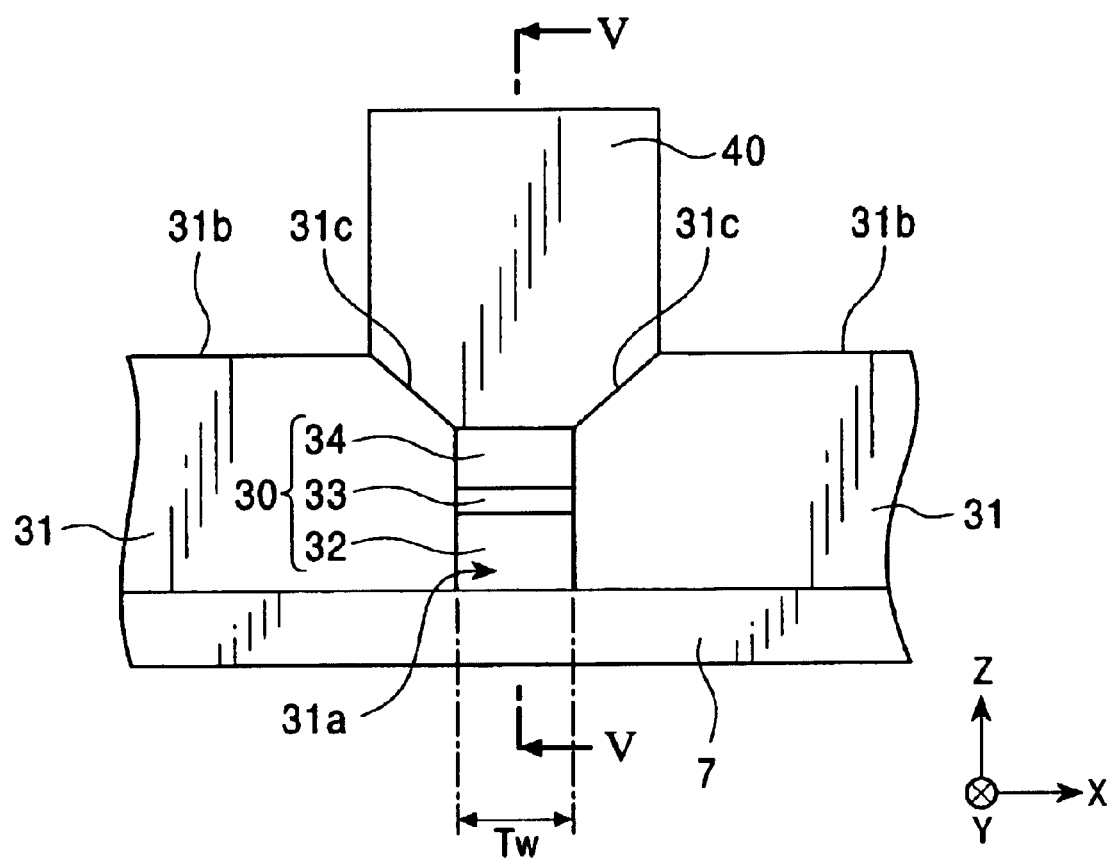
FIG. 4 a partial front view of a thin film magnetic head according to a further embodiment of the present invention.
Figure 5:
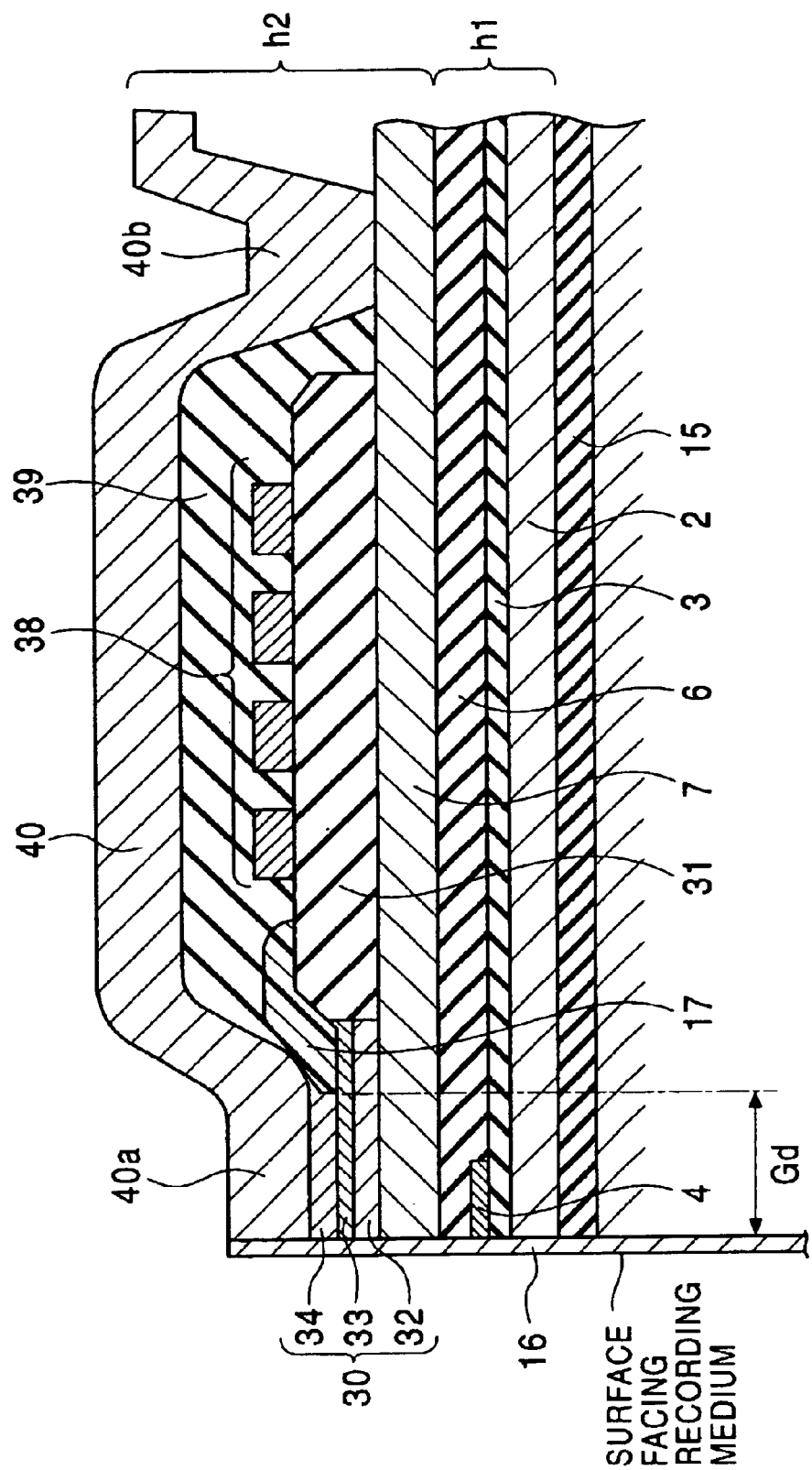
FIG. 5 is a longitudinal sectional view of the thin film magnetic head shown in FIG. 4.

FIG. 4 is a partial front view showing the structure of a thin film magnetic head according to a further embodiment of the present invention, and FIG. 5 is a longitudinal sectional view taken along line V—V in FIG. 4, as viewed from the direction of arrows.

In this embodiment, the structure of the reproducing head hi is the same as FIGS. 1 to 3.

As shown in FIG. 4, an insulating layer 31 made of, for example, an inorganic insulating material is formed on the lower core layer 7. In the insulating layer 31, a track width forming trench 31a is formed with a predetermined length dimension from the surface facing the recording medium in the height direction (the Y direction shown in the drawing). The track width forming trench 31a is formed with the track width Tw at the surface facing the recording medium (refer to FIG. 4).

In the track width forming trench 31a, a pole portion 30 comprising a lower pole layer 32, a nonmagnetic gap layer 33 and an upper pole layer 34 is formed.

The lower pole layer 32 is formed directly on the lower core layer 7 by plating. The gap layer 33 formed on the lower pole layer 32 is preferably made of a nonmagnetic metal material which can be plated. Specifically, at least one material is preferably selected from NiP, NiPd, NiW, NiMo, Au, Pt, Rh, Pd, Ru, and Cr.

In the present invention, for example, NiP is used for the gap layer 33. This is because the gap layer 33 can be appropriately made nonmagnetic by using NiP for the gap layer 33.

The pole portion 30 may comprise two layers including the gap layer 33 and the upper pole layer 34.

A Gd determining layer 37 is formed on the gap layer 33 to extend from a position at a distance corresponding to the gap depth (Gd) from the surface facing the recording medium to the top of the insulating layer 31. The Gd determining layer 37 is made of, for example, an organic insulating material.

The upper pole layer 34 formed on the gap layer 33 is magnetically connected to an upper core layer 40 formed thereon.

As described above, with the gap layer 33 made of a nonmagnetic metal material which can be plated, the lower pole layer 32, the gap layer 33 and the upper pole layer 34 can be continuously formed by plating.

As shown in FIG. 5, a coil layer 38 is spirally patterned on the insulating layer 31. The coil layer 38 is covered with an insulating layer 39 made of an organic insulating material.

As shown in FIG. 4, inclined surfaces 31c are formed at both side ends of the track width forming trench 31a in the track width direction (the X direction) to extend from the upper surface of the upper pole layer 34 to the upper surface 31b of the insulating layer 31 so that the width of the track width forming trench 31a gradually increases in the direction away from the lower core layer 7.

As shown in FIG. 4, the tip portion 40a of the upper core layer 40 is formed to extend from the top of the upper pole layer 34 to the tops of the inclined surfaces 31c in the direction away from the lower core layer 7.

As shown in FIG. 5, the upper core layer 40 is formed on the insulating layer 39 to extend from the surface facing the recording medium in the height direction (the Y direction shown in the drawing), the base end 40b of the upper core layer 40 being formed directly on the lower core layer 7.

In the embodiment shown in FIGS. 4 and 5, the lower pole layer 32 and/or the upper pole layer 34 comprises any one of the soft magnetic films according to the first, second and third embodiments.

All the soft magnetic films contain at least one element α of Tc, Ru, Rh, Pd, Re, Os, Ir, and Pt, and have excellent corrosion resistance, as compared with a NiFe alloy not containing the element α. Also, the soft magnetic films have excellent film characteristics such as the saturation magnetic flux density Bs, and thus the use of the FeNiα alloy for a pole layer permits concentration of a magnetic flux near the gap of the magnetic layer, thereby improving the recording density.

The lower pole layer 32 and the upper pole layer 34 which constitute the pole portion 30 formed in a narrow space are required to have a high saturation magnetic flux density Bs and preferably have lower surface roughness. In the thin film magnetic head shown in FIGS. 4 and 5 in which the pole portion 30 having the track width Tw is formed between the lower core layer 7 and the upper core layer 22, the upper pole layer 32 and/or the lower pole layer 34 preferably comprises the soft magnetic film according to the third embodiment.

Namely, the upper pole layer 34 and/or the lower pole layer 32 preferably comprises the soft magnetic film represented by the composition formula $Fe_xNi_y\alpha_z$ (wherein element α is at least one of Tc, Ru, Rh, Pd, Re, Os, Ir, and Pt) wherein the composition ratio X of Fe is 65% by mass to 74% by mass, the composition ratio Y of Ni is 25% by mass to 34% by mass, the composition ratio Z of the element α is 1% by mass to 7% by mass, and X+Y+Z=100% by mass.

The soft magnetic film of the third embodiment has a saturation magnetic flux density Bs of 1.9 T or more, and a center line average surface roughness Ra of 5 nm or less. Therefore, by using the soft magnetic film of the third embodiment for the lower pole layer 32 and/or the upper pole layer 34, the advantage of track narrowing can be effectively ensured, and a thin film magnetic head appropriately adaptable to a higher recording density and having excellent corrosion resistance can be manufactured.

In the present invention, the lower pole layer 19 or 32 and/or the upper pole layer 21 or 34 shown in FIGS. 2 to 5 may comprise a lamination of at least two magnetic layers. In this case, the magnetic layer in contact with the gap layer 20 or 33 preferably comprises the FeNiα alloy of the present invention. Particularly, the magnetic layer in contact with the gap layer 20 or 33 preferably comprises the soft magnetic film of the third embodiment. As a result, the magnetic flux can be concentrated in the vicinity of the gap, and a thin film magnetic head adaptable to a higher recording density in future can be manufactured.

Although the magnetic layer other than the magnetic layer in contact with the gap layer 20 or 33 may be made of any magnetic material having any composition ratio, the saturation magnetic flux density Bs may be lower than that of the magnetic layer in contact with the gap layer 20 or 33. As a result, the recording magnetic field is appropriately led to the magnetic layer in contact with the gap layer 20 or 33 from the other magnetic layer, thereby permitting an attempt to increase the recording density.

Although the lower pole layer 19 or 32 preferably has a high saturation magnetic flux density Bs, the saturation magnetic flux density Bs of the lower pole layer 19 or 32 is set to be lower than that of the upper pole layer 21 or 34 to facilitate reversal of magnetization of the leakage magnetic field between the lower pole layer and the upper pole layer, thereby increasing the density of the signals written on the recording medium.

Figure 6:
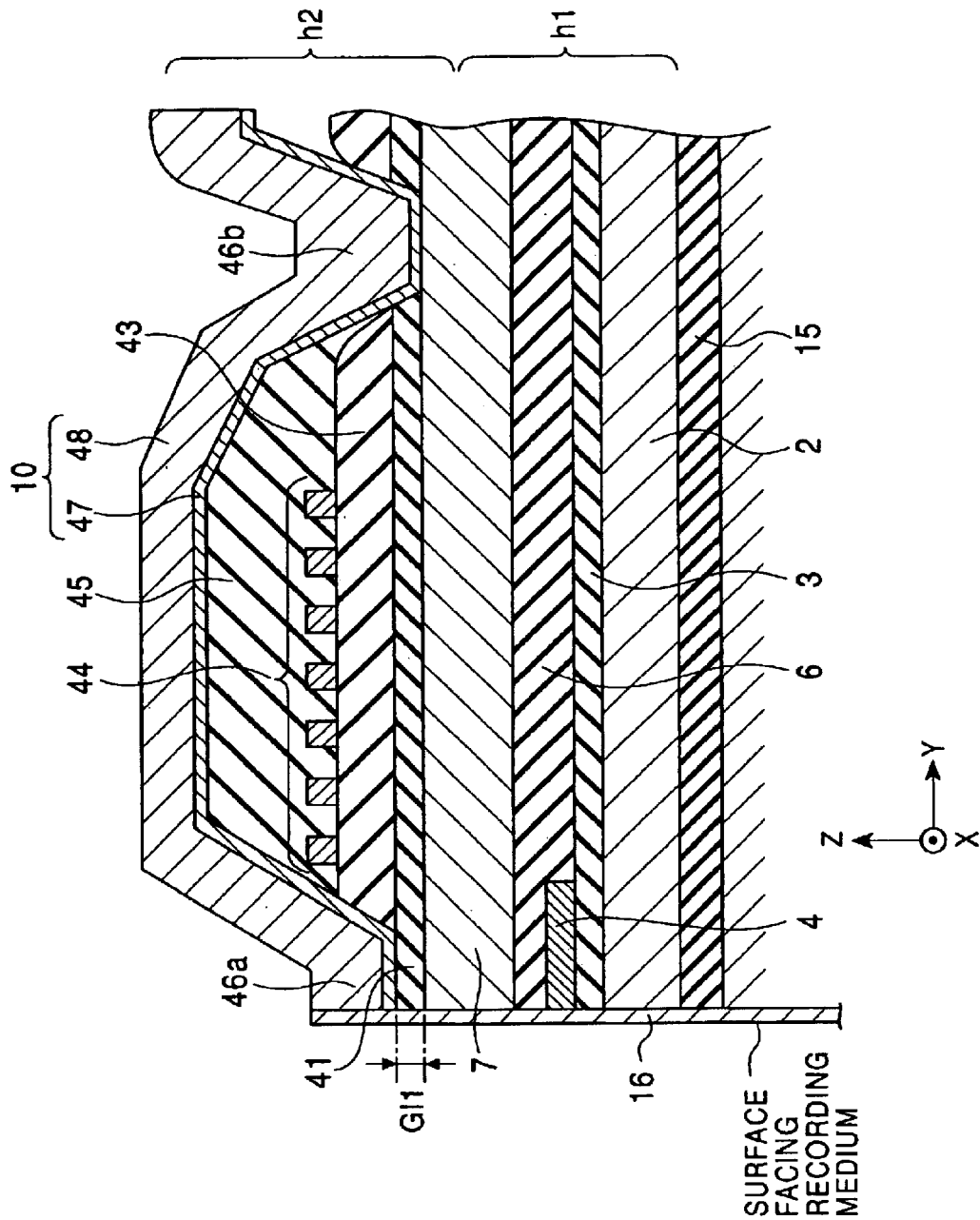
FIG. 6 is a longitudinal sectional view of a thin film magnetic head according to a still further embodiment of the present invention.

FIG. 6 is a longitudinal sectional view showing a thin film magnetic head according to a still further embodiment of the present invention.

The structure of the thin film magnetic head of this embodiment is similar to that shown in FIG. 1, but different in that the upper core layer 10 comprises two magnetic layers.

The upper core layer 10 comprises a high Bs layer 47 having a high saturation magnetic flux density Bs and an upper layer 48 laminated thereon.

The high Bs layer 47 and/or the lower core layer 7 comprises any one of the soft magnetic films according to the first, second and third embodiments.

All the soft magnetic films contain at least one element α of Tc, Ru, Rh, Pd, Re, Os, Ir, and Pt, and have excellent corrosion resistance, as compared with a NiFe alloy not containing the element α. Also, the soft magnetic films have excellent film characteristics such as the saturation magnetic flux density Bs, and thus the use of the soft magnetic films for a pole layer permits concentration of a magnetic flux near the gap of the pole layer, thereby improving the recording density.

The upper layer 48 which constitutes the upper core layer 10 has a lower saturation magnetic flux density Bs than the high Bs layer 47, but has higher resistivity than the high Bs layer 47. The upper layer 48 is made of, for example, a $Ni_{80}Fe_{20}$ alloy.

Therefore, the high Bs layer 47 has a higher saturation magnetic flux density Bs than the upper layer 48 to concentrate the magnetic flux near the gap, thereby improving recording resolution.

By providing the upper layer 48 with high resistivity in the upper core layer 10, an eddy current loss produced by an increase in the recording frequency can be decreased, and a thin film magnetic head adaptable to a higher recording frequency in future can be manufactured.

As shown in FIG. 6, the high Bs layer 47 is preferably formed on the lower side in contact with a gap layer 41. The high Bs layer 47 may be formed only at the front end 46a of the upper core layer 10 in direct contact with the gap 41.

Also, the lower core layer 7 may comprise two layers including a high Bs layer and a high resistivity layer. In this case, the high Bs layer is formed on the high resistivity layer to be opposed to the upper core layer 10 with the gap layer 41 provided therebetween.

Although, in the embodiment shown in FIG. 6, the upper core layer 10 has a laminated structure comprising the two layers, the upper core layer may comprise at least three layers. In this case, the high Bs layer 47 is preferably formed in contact with the magnetic gap layer 41.

Figure 7:
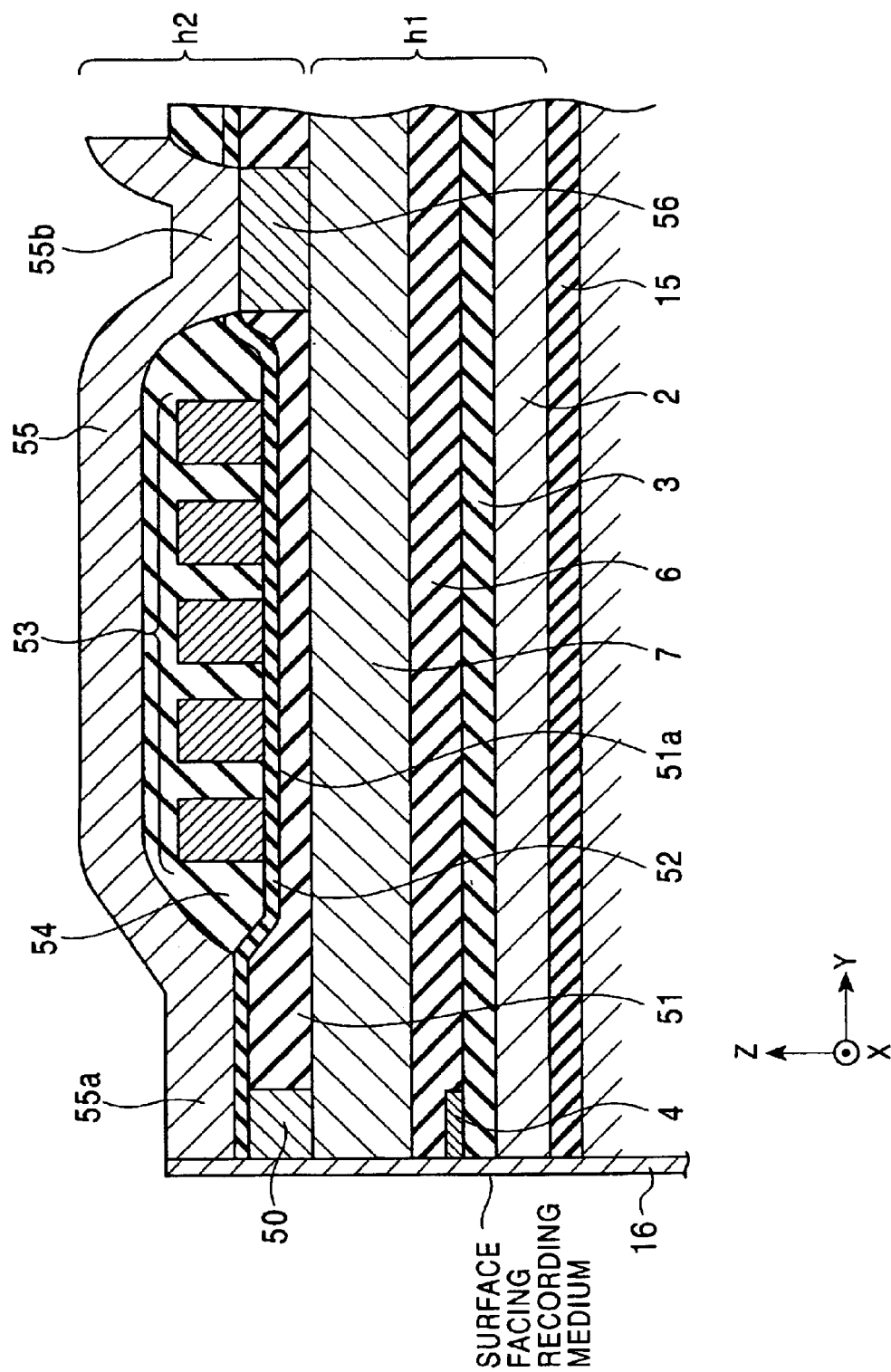
FIG. 7 is a longitudinal sectional view of a thin film magnetic head according to a further embodiment of the present invention.

FIG. 7 is a longitudinal sectional view of a thin film magnetic head according to a further embodiment of the present invention.

The reading head h1 of the embodiment shown in FIG. 7 has the same construction as FIG. 1. As shown in FIG. 7, a lower pole layer 50 is formed on the lower core layer 7 to protrude from the surface facing the recording medium. Furthermore, an insulating layer 51 is formed behind the lower pole layer 50 in the height direction (the Y direction shown in the drawing). The upper surface of the insulating layer 5 has a recessed shape to form a coil forming surface 51.

A gap layer 52 is formed to extend from the top of the lower pole layer 50 to the top of the insulating layer 51. Furthermore, a coil layer 53 is formed on the coil forming surface 51a of the insulating layer 51 with a gap layer provided therebetween. The coil layer 53 is covered with an insulating layer 54 of an inorganic insulating material.

As shown in FIG. 7, an upper core layer 55 is formed by, for example, the frame plating process, to extend from the gap layer 52 to the insulating layer 54.

The front end 55a of the upper core layer 55 is formed on the gap layer 52 opposite to the lower pole layer 50. The base end 55b of the upper core layer 55 is magnetically connected to the lower core layer 7 through a lifting layer 56 formed on the lower core layer 7.

In this embodiment, the upper core layer 55 and/or the lower pole layer 50 comprises any one of the soft magnetic films according to the first, second and third embodiments.

All the soft magnetic films contain at least one element α of Tc, Ru, Rh, Pd, Re, Os, Ir, and Pt, and have excellent corrosion resistance, as compared with a NiFe alloy not containing the element α. By forming the lower pole layer 50 shown in FIG. 7, which is made of a FeNiα alloy of the present invention having a higher saturation magnetic flux density Bs than the lower core layer 7, the magnetic flux can be concentrated near the gap, thereby improving the recording density.

Although the entire of the upper core layer 55 may comprise the FeNiα alloy, like in FIG. 6, the upper core layer may have a laminated structure comprising at least two magnetic layers in which the high Bs layer opposed to the gap layer 52 may comprise the FeNiα alloy film. In this case, from the viewpoint of concentration of the magnetic flux near the gap for improving the recording density, only the tip portion 55a of the upper core layer 55 preferably has a laminated structure comprising at least two magnetic layers so that the high Bs layer is formed in contact with the gap layer 52.

In the present invention, in each of the embodiments shown in FIGS. 1 to 7, the FeNiα alloy film is preferably formed by plating. In the present invention, the FeNiα alloy can be deposited by an electroplating process using a pulse current. By depositing the FeNiα alloy by plating, the film can be formed to any desired thickness larger than the thickness of a film formed by sputtering.

Although, in each of the embodiments, the layer denoted by reference numeral 7 serves as both the lower core layer and the upper shield layer, the lower core layer and the upper shield layer may be formed separately. In this case, an insulating layer is interposed between the lower core layer and the upper shield layer.

Next, the general method of manufacturing each of the thin film magnetic heads shown in FIGS. 1 to 7 will be described.

In the thin film magnetic head shown in FIG. 1, the gap layer 8 is first formed on the lower core layer 7, and then the coil layer 9 is patterned on the gap layer 8. The insulating layer 11 is formed on the coil layer 9, and then the upper core layer 10 is patterned by the frame plating process to extend from the gap layer 8 to the insulating layer 11.

In the thin film magnetic head shown in FIGS. 2 and 3, the Gd determining layer 17 is formed on the lower core layer 7, and then the pole portion 18 comprising the lower pole layer 19, the nonmagnetic gap layer 20 and the upper pole layer 21 is formed by continuous plating using a resist to extend from the surface facing the recording medium in the height direction. Then, the insulating layer 23 is formed behind the pole portion 18 in the height direction, and the upper surfaces of the pole portion 18 and the insulating layer 23 are planarized to the same plane by, for example, a CMP technique. The coil layer 24 is spirally patterned on the insulating layer 23, and then the insulating layer 25 is formed on the coil layer 24. Then, the upper core layer 22 is formed by, for example, the frame plating process, to extend from the pole portion 18 to the insulating layer 25.

In the thin film magnetic head shown in FIGS. 4 and 5, the insulating layer 31 is formed on the lower core layer 7, and then the track width forming trench 31a is formed in the insulating layer 31 by using a resist to extend from the surface facing the recording medium in the height direction. Furthermore, the inclined surfaces 31c are formed in the track width forming trench 31, as shown in FIG. 4.

The lower pole layer 32 and the nonmagnetic gap layer 33 are formed in the track width forming trench 31a. Then, the Gd determining layer 37 is formed to extend from the gap layer 33 to the insulating layer 31, and the upper pole layer 34 is formed on the gap layer 33. Next, the coil layer 38 is spirally patterned on the insulating layer 31, and then the insulating layer 39 is formed on the coil layer 38. The upper core layer 40 is formed by, for example, the frame plating process, to extend from the upper pole layer 34 to the insulating layer 39.

In the thin film magnetic head shown in FIG. 6, the gap layer 41 is first formed on the lower core layer 7, and the insulating layer 43 is formed thereon. Then, the coil layer 44 is patterned on the insulating layer 43, and the insulating layer 45 is formed on the coil layer 44. Then, the upper core layer 10 comprising the high Bs layer 47 and the upper layer 48 is formed by the frame plating process to extend from the gap layer 41 to the insulating layer 45.

In the thin film magnetic head shown in FIG. 7, the lower pole layer 50 is formed on the lower core layer 7 by using a resist, and the insulating layer 51 is formed behind the lower pole layer 50 in the height direction. The upper surfaces of the lower pole layer 50 and the insulating layer 51 are planarized by the CMP technique, and then the coil forming surface 51 a having a recessed shape is formed at the top of the insulating layer 51. Then, the gap layer 52 is formed to extend from the lower pole layer 50 to the insulating layer 51, and the coil layer 53 is spirally patterned on the gap layer 52. Furthermore, the insulating layer 54 is formed on the coil layer 53, and the upper core layer 55 is formed by, for example, the frame plating process, to extend from the gap layer 52 to the insulating layer 54.

Next, the method of producing the soft magnetic film of the present invention will be described below. The soft magnetic film of the first embodiment is formed by electroplating.

The method of producing the soft magnetic film of the first embodiment (FeNiPd) is first described. In the present invention, a plating bath containing Fe ions and Ni ions is used in an electroplating step, and the plating bath further contains $PdCl_2$ which is added thereto in an amount of 0.01 g/l to 0.1 g/l based on the total amount of the plating bath.

Therefore, the soft magnetic film of the fist embodiment comprising the FeNiPd alloy can be formed by plating, in which the Pd composition ratio is 1% by mass to 10% by mass.

The method of producing the soft magnetic film (FeNiRh) of the first embodiment is described blow. In this embodiment, a plating bath containing Fe ions and Ni ions is used in the electroplating step, and the plating bath further contains Rh which is added thereto by adding a strongly acidic Rg adding solution having a Rh content of 100 g/l in an amount of 0.1 g/l to 0.2 g/l based on the total amount of the plating bath.

Therefore, the soft magnetic film of the fist embodiment comprising the FeNiRh alloy can be formed by plating, in which the Rh composition ratio is 1% by mass to 10% by mass.

In forming the above-described soft magnetic film of the first embodiment having a Fe composition ratio of about 51 to 74% by mass, a Ni composition ratio of about 24 to 46% by mass, and a Pd composition ratio of 1.1 to 4.9% by mass, the total composition ratio of Fe, Ni and Pd being 100% by mass, the plating bath used in the electroplating step has the same composition as a conventional Watt bath comprising $NiCl_2$ hexahydrate (117 g/l), $NiSO_4$ hexahydrate (50 g/l), NaCl (25 g/l), boric acid (25 g/l), saccharin sodium (2 g/l) serving as a stress relaxing agent, and sodium lauryl sulfate (0.02 g/l) serving as a surfactant, and further comprises $FeSO_4$ heptahydrate and $PdCl_2$ which are added to the conventional composition, the amount of $PdCl_2$ added being 0.05 to 0.1 g/l based on the total amount of the plating bath.

In the electroplating step, a pulse current is applied to the plating bath using a FeNi alloy sputtered film as a cathode. After a FeNiPd alloy plating film having a desired thickness is formed on the cathode, the electroplating step is finished.

In forming the above-described soft magnetic film of the first embodiment having a Fe composition ratio of about 75% by mass, a Ni composition ratio of about 166% by mass, and a Rh composition ratio of 9% by mass, i.e., the composition $Fe_{75}Ni_{16}Rh_9$, the plating bath used in the electroplating step has the same composition as the conventional Watt bath, and further comprises $FeSO_4$ heptahydrate and a sulfuric acid Rh addition solution having a Rh content of 100 g/l (Rh Plating Solution "RH-#221" produced by N. E-Chemkit Co., Ltd.), which are added to the conventional composition, the amount of the Rh addition solution added being 0.11 g/l based on the total amount of the plating bath.

Like in production of the FeNiPd alloy, in the electroplating step, a pulse current is applied to the plating bath using a FeNi alloy sputtered film as a cathode. After a FeNiRh alloy plating film having a desired thickness is formed on the cathode, the electroplating step is finished.

The Pd composition ratio of the thus-produced soft magnetic film (FeNiPd) substantially increases as the amount of $PdCl_2$ added increases. However, even with the same amount of $PdCl_2$ added in the range of 0.05 g/l to 0.10 g/l, the Pd composition ratio of the soft magnetic film varies in some cases. With the same Ni composition ratio, the Pd composition ratio tends to decrease as the Fe composition ratio increases.

Since the soft magnetic film of the first embodiment is formed by electroplating using the pulse current, a time when the current is passed, and a space time when the current is not passed are provided during plating. By proving the time when the current is not passed, the FeNiα alloy film can be slowly formed by plating to relieve a deviation of the current density distribution in plating even when the Fe ion concentration of the plating bath is increased, as compared with use of a DC current.

The pulse current is preferably applied by, for example, repeating ON and OFF in a cycle of several seconds with a duty ratio of about 1.0 to 0.5. The conditions for the pulse current influence the average crystal grain diameter of the FeNiα alloy and the center line average roughness Ra of the film surface.

As described above, in the electroplating process, a deviation of the current density distribution in plating can be relieved to increase the Fe content of the FeNiα alloy, as compared with an electroplating process using a DC current.

In the present invention, by the electroplating process using the pulse current, the degree of control freedom of the composition ratios can be increased to facilitate control of the Fe composition ratio of the FeNiα alloy to 55% by mass to 90% by mass, preferably 72% by mass to 68% by mass, as compared with the electroplating process using the DC current.

Next, the method of producing the soft magnetic films according to the second and third embodiments will be described.

In the present invention, the FeNiα alloy is deposited by the electroplating process using the pulse current and the plating bath having a Fe ion concentration of 1.0 g/l to 10 g/l, a Ni ion concentration of 5 g/l to 40 g/l, and an ion concentration of element α (at least one of Tc, Ru, Rh, Pd, Re, Os, Ir and Pt) of 0.01 g/l to 0.2 g/l.

Therefore, a $Fe_dNi_e\alpha_f$ alloy can easily be formed by plating with high reproducibility, in which the composition ratio d of Fe is 58% by mass to 77% by mass, the composition ratio e of Ni is 18% by mass to 37% by mass, the composition ratio f of the element α is 1% by mass to 12% by mass, and d+e+f=100% by mass.

This production method has two characteristics. One of the characteristics is that the pulse current is used in the electroplating process. The other characteristic is that the Ni ion concentration is decreased. Although the Ni ion concentration of the plating bath is generally about 40 g/l, the Ni ion concentration of the plating bath used in the present invention is decreased to a value lower than the conventional concentration. Therefore, during plating, the agitation effect can be increased to improve the movement (substitution) of Fe ions and element α ions contained in the plating solution to a surface to be plated, whereby the FeNiα alloy having the above-described composition can be easily deposited by plating with high reproducibility.

By using the plating bath having the above ion concentrations, the composition ratio of the element α can be increased to 12% by mass at maximum.

In the present invention, the Ni ion concentration is preferably 15 g/l or less or 10 g/l or less.

In the present invention, the ion concentration of the element α is preferably 0.01 g/l to 0.05 g/l.

By using the plating bath in which the Ni ion concentration and the ion concentration of the element α are set as described above, the soft magnetic film of the third embodiment of the present invention can easily be formed by plating with high reproducibility.

The above-described method of producing each of the soft magnetic films can be applied to formation of the lower core layer 7 and/or the upper core layer 10 shown in FIG. 1, formation of the lower pole layer 19 and/or the upper pole layer 21 shown in FIGS. 2 and 3, formation of the lower pole layer 32 and/or the upper pole layer 34 shown in FIGS. 4 and 5, formation of the lower core layer 7 and/or the high Bs layer 47 shown in FIG. 6, and formation of the lower pole layer 50 and/or the upper core layer 55 shown in FIG. 7.

By using the above method of producing a soft magnetic film, a core layer or a pole layer of a thin film magnetic head having any one of the structures shown in FIGS. 1 to 7 can easily be formed by plating with high reproducibility. However, in the embodiments shown in FIGS. 2 to 5 in which the pole portion 18 or 30 is formed with the track width Tw between the lower core layer 7 and the upper core layer 22 or 40 in a separate step, the method of producing the soft magnetic film of the third embodiment is preferably used for forming the lower pole layer 19 or 32 and/or the upper pole layer 21 or 34 by plating.

In the thin film magnetic head shown in FIGS. 2 and 3, a resist layer is formed on the lower core layer 7, and a trench is formed in the resist layer by exposure. Then, the pole portion 18 is formed in the thus-formed trench by plating. In this case, the width dimension of the trench in the track width direction (the X direction) is preferably about 0.1 μm to 0.5 μm in order to appropriately cope with narrowing of the track, the depth dimension (the Y direction) is substantially the same as the width dimension, and the height dimension (the Z direction) is about 2 to 5 times the width dimension.

In appropriately forming the lower pole layer 19, the gap layer 20 and the upper pole layer 21 in the very narrow space by plating, movement (substitution) of Fe ions and element α ions contained in the plating solution in this space must be improved, otherwise the Fe composition ratio of the pole layer is easily decreased to fail to form a pole having a high saturation magnetic flux density Bs or cause the problem of roughening the film surface due to excessive amounts of Fe and element α. The pole layer formed in such a narrow space is easily corroded unless surface roughness is decreased as much as possible, and the pole layer must be thus formed with a composition which decreases the center line average roughness Ra of the film surface.

Therefore, the Ni ion concentration of the plating bath must be decreased to improve the agitating effect, and thus the Ni ion concentration of the plating bath is set to 5 g/l to 15 g/l or 10 g/l or less, and the ion concentration of the element α is set to 0.01 g/l to 0.05 g/l.

By decreasing the Ni ion concentration to improve the agitating effect, the Fe amount of the FeNiα alloy can be increased. In the present invention, the Fe composition ratio can be set to 65% by mass to 74% by mass, the composition ratio of the element α can be set to 1% by mass to 7% by mass, and the Ni composition ratio can be set to 25% by mass to 34% by mass.

With the soft magnetic film of the third embodiment having the above composition ratios, a high saturation magnetic flux density Bs of 1.9 T or more can be obtained, and the center line average roughness Ra of the film surface can be suppressed to 5 nm or less. Therefore, a pole layer having a high saturation magnetic flux density Bs and excellent corrosion resistance can easily be formed by plating in the narrow space with high reproducibility.

Although the FiNiα alloy is used for the thin film magnetic heads shown in FIGS. 1 to 7, application of this alloy is not limited to these magnetic heads. For example, the FeNiα alloy can be used for planar magnetic elements such as a thin film inductor, etc.

EXAMPLES

Examples of the soft magnetic films of the present invention are described below.

In experiment, a FeNiPd alloy or FeNiRh alloy was deposited by plating using a pulse current and each of the plating baths shown in Table 1. As comparative examples, a FeNi alloy was deposited by plating using a pulse current and each of the plating baths shown in Table 1.

In this experiment, a film of each of the FeNiPd alloy, the FeNiRh alloy and the FeNi alloy was formed on a substrate by solid plating. The temperature of the plating bath was about 30° C., the pH of the electrode used was about 3.3, and the current density was about 21 (mA/cm$^2$).

TABLE 1

| | | | | Bath Characteristics | | | | | | | |
|---|---|---|---|---|---|---|---|---|---|---|---|
| | Fe ion (g/l) | Amount of Ni added (g/l) | Ni ion (g/l) | Amount of PdCl$_2$ or Rh addition solution (g/l) | Pd ion (g/l) | Rh ion (g/l) | Saccharin sodium (g/l) | Boric acid (g/l) | Sodium chloride (g/l) | Sodium lauryl sulfate (g/l) | Sodium 2-ethylhexyl sulfate (ml/l) |
| Comp. Example 1 | 4.8 | 40(1 bath) | 40 | 0 | 0.000 | — | 2 | 25 | 25 | 0.02 | — |
| Comp. Example 2 | 6.0 | 40(1 bath) | 40 | 0 | 0.000 | — | 2 | 25 | 25 | 0.02 | — |
| Example 1 | 6.0 | 40(1 bath) | 40 | PdCl$_2$ = 0.01 | 0.006 | — | 2 | 25 | 25 | 0.02 | — |
| Example 2 | 6.0 | 40(1 bath) | 40 | PdCl$_2$ = 0.10 | 0.030 | — | 2 | 25 | 25 | 0.02 | — |
| Example 3 | 6.0 | 40(1 bath) | 40 | PdCl$_2$ = 0.05 | 0.030 | — | 2 | 25 | 25 | 0.02 | — |
| Example 4 | 6.0 | 40(1 bath) | 40 | PdCl$_2$ = 0.10 | 0.060 | — | 2 | 25 | 25 | 0.02 | — |
| Example 5 | 6.0 | 40(1 bath) | 40 | PdCl$_2$ = 0.10 | 0.060 | — | 2 | 25 | 25 | 0.02 | — |
| Example 6 | 6.0 | 40(1 bath) | 40 | PdCl$_2$ = 0.10 | 0.060 | — | 2 | 25 | 25 | 0.02 | — |

TABLE 1-continued

|  | Fe ion (g/l) | Amount of Ni added (g/l) | Ni ion (g/l) | Amount of PdCl$_2$ or Rh addition solution (g/l) | Pd ion (g/l) | Rh ion (g/l) | Saccharin sodium (g/l) | Boric acid (g/l) | Sodium chloride (g/l) | Sodium lauryl sulfate (g/l) | Sodium 2-ethylhexyl sulfate (ml/l) |
|---|---|---|---|---|---|---|---|---|---|---|---|
| Example 7 | 9.0 | 40(1 bath) | 40 | PdCl$_2$ = 0.10 | 0.060 | — | 2 | 25 | 25 | 0.02 | — |
| Example 8 | 15.1 | 40(1 bath) | 36.8 | Rh addition solution = 0.11 | — | 0.11 | 2 | 25 | 25 | 0.02 | — |
| Example 9 | 2.4 | 10(¼ bath) | 10 | PdCl$_2$ = 0.03 | 0.018 | — | 1 | 25 | 25 | — | 0.1 |
| Example 10 | 2.4 | 10(¼ bath) | 10 | PdCl$_2$ = 0.05 | 0.030 | — | 1 | 25 | 25 | — | 0.1 |
| Example 11 | 2.6 | 10(¼ bath) | 10 | PdCl$_2$ = 0.07 | 0.042 | — | 1 | 25 | 25 | — | 0.1 |
| Example 12 | 3.2 | 10(¼ bath) | 10 | PdCl$_2$ = 0.12 | 0.072 | — | 1 | 25 | 25 | — | 0.1 |
| Example 13 | 3.6 | 10(¼ bath) | 10 | PdCl$_2$ = 0.16 | 0.096 | — | 1 | 25 | 25 | — | 0.1 |

The composition ratios of Fe, Ni and Pd, stress, coercive force (hard magnetization axis, easy magnetization axis), anisotropic magnetic field, saturation magnetic flux density Bs, and resistivity were measured for the soft magnetic film of each of Examples 1 to 13 and Comparative Example 1 (a conventional soft magnetic film) and Comparative Example 2. The experimental results are shown in Table 2.

In Examples 1 to 4, the Fe composition ratio was about 51 to 53% by mass, the Ni composition ratio was about 42 to 46% by mass, and the Pd composition ratio was about 1.1 to 4.9% by mass. In Examples 1 and 2, the corrosion resistance was slightly improved as compared with Comparative Example 1 not containing Pd and having an Fe composition ratio equivalent to the examples. In Examples 3 and 4, the

TABLE 2

|  | Composition (% by mass) | | | Corrosion resistance | Stress (MPa) | Coercive force (A/m) | | Anisotropic magnetic field (A/m) | Saturation magnetic flux density (T) | Resistivity (μΩ/cm) |
|---|---|---|---|---|---|---|---|---|---|---|
|  | Fe | Ni | Pd or Rh | | | Easy axis | Hard axis | | | |
| Comp. Example 1 | 55 | 45 | — | ○ | 135 | 213 | 158 | 340 | 1.57 | 44 |
| Comp. Example 2 | 72 | 28 | — | x | 215 | 533 | 727 | 69 | 1.91 | 32 |
| Example 1 | 52.9 | 46 | Pd = 1.1 | ○ | 147 | 209 | 146 | 569 | 1.51 | 44 |
| Example 2 | 51.7 | 45 | Pd = 3.3 | ○ | 199 | 269 | 150 | 498 | 1.55 | 37 |
| Example 3 | 50.6 | 45 | Pd = 4.4 | ⊚ | 131 | 237 | 162 | 60 | 1.57 | 42 |
| Example 4 | 53.1 | 42 | Pd = 4.9 | ⊚ | 149 | 205 | 126 | 640 | 1.54 | 44 |
| Example 5 | 72.5 | 24 | Pd = 3.5 | ○ | 441 | 1337 | 1050 | 142 | 1.86 | 33 |
| Example 6 | 74.3 | 24 | Pd = 1.7 | ○ | 350 | 764 | 605 | 62 | 1.88 | 41 |
| Example 7 | 72.8 | 25 | Pd = 2.2 | ○ | 427 | 907 | 732 | 58 | 1.87 | 39 |
| Example 8 | 75 | 16 | Rh = 9 | ○ | — | — | — | — | — | — |
| Example 9 | 74 | 24 | Pd = 2 | ○ | 134 | 302 | 294 | 191 | 1.94 | — |
| Example 10 | 71 | 25 | Pd = 4 | ○ | 148 | 255 | 207 | 127 | 1.91 | 32 |
| Example 11 | 70 | 24 | Pd = 6 | ○ | 157 | 247 | 223 | 167 | 1.92 | 33 |
| Example 12 | 71 | 20 | Pd = 9 | ○ | 209 | 255 | 255 | 135 | 1.92 | 34 |
| Example 13 | 66 | 22 | Pd = 12 | ○ | 240 | — | — | — | 1.86 | — |

The experimental results of Examples 1 to 8 are described.

The corrosion resistance of each soft magnetic film was evaluated by a humidity test in which a film was exposed at temperature of 80° C. and a humidity of 90% for 96 hours.

After the humidity test, the corroded state of each soft magnetic film was observed under a microscope (×60), and the corrosion resistance was evaluated on the basis of the criteria that the corroded state substantially equivalent to Comparative Example 1 (conventional soft magnetic film) was marked with ○, the corroded state worse than Comparative Example 1 was marked with x, and the corroded state better than Comparative Example 1 was marked with ⊚.

corrosion resistance was significantly improved as compared with of the conventional soft magnetic film of Comparative Example 1, and particularly, in Example 4, no corroded portion was observed in the surface after the corrosion test.

Example 5 had a Fe composition ratio of 72.5% by mass, and a Pd composition ratio of 3.5% by mass substantially the same as Example 3. However, in Example 5, the corrosion resistance was significantly improved as compared with of Comparative Example 2 not containing Pd and having an Fe composition ratio equivalent the example, and the corrosion resistance is slightly higher than the conventional soft magnetic film of Comparative Example 1.

Examples 6 and 7 had substantially the same Fe composition and Pd composition ratios of 1.7% by mass and 2.2% by mass, respectively. In Examples 6 and 7, although Pd composition ratios were as low as about 2% by mass, the corrosion resistance was significantly improved as compared with of Comparative Example 2 not containing Pd and having an Fe composition ratio equivalent to the examples, and the corrosion resistance is slightly higher than the conventional soft magnetic film of Comparative Example 1.

Example 8 had a Fe composition ratio of 75% by mass, and a Rh composition ratio of 9% by mass. Like in Example 5 having an Fe composition ratio to Example 8, the corrosion resistance was significantly improved as compared with of Comparative Example 2 not containing Rh and having an Fe composition ratio equivalent to the example, and the corrosion resistance is slightly higher than the conventional soft magnetic film of Comparative Example 1.

In Examples 1 to 4, stress, coercive force, anisotropic magnetic field, saturation magnetic flux density Bs, and resistivity were substantially the same as Comparative Example 1 not containing Pd and ant Fe composition ratio equivalent to the examples.

In Examples 5 to 7, saturation magnetic flux density Bs, and resistivity were substantially the same as Comparative Example 2 not containing Pd and an Fe composition ratio equivalent to the examples, and the saturation magnetic flux density was about 1.9 T.

The above-described results indicate that according to the present invention, the corrosion resistance of a soft magnetic film can be improved by adding Pd or Rh to a FeNi alloy, and the film characteristics such as the saturation magnetic flux density Bs, etc. are substantially the same as a FeNi alloy no containing a noble metal such as Pd, and having an Fe amount equivalent to the FeNiPd or FeNiRh alloy.

Next, Examples 9 to 13 are described below. In Examples 9 to 13, the Ni ion concentration of the plating bath was decreased, as compared with Examples 1 to 8 (refer to Table 1). Although, in Examples 1 to 8, the Ni ion concentration was about 40 g/l equal to the Ni ion concentration of a conventional plating bath, in Examples 9 to 13, the Ni ion concentration was decreased to about 10 g/l corresponding to ¼ of 40 g/l.

Therefore, the agitating effect could be improved to permit appropriate substitution in the plating solution on a surface to be plated. Table 1 indicates that the Fe ion concentrations of the plating baths in Examples 9 to 13 are lower than the Fe ion concentrations in Examples 1 to 8. However, as shown in Table 2, the Fe amounts of the FeNiPd alloys of Examples 9 to 13 can be increased to a value larger than or the same as Examples 1 to 8.

Table 2 also indicates that the Pd amounts of the FeNiPd alloys of Examples 9 to 13 can be increased to 12% by mass at maximum, which is larger than the Pd amounts of the FeNiPd alloys of Examples 1 to 7.

In Examples 9 to 13, the saturation magnetic flux density Bs exceeds 1.9 T according to the composition ratios, and a high saturation magnetic flux density Bs can be obtained.

As a result of measurement of the corrosion resistance by the same method as described above, all Examples 9 to 13 exhibited excellent corrosion resistance.

In the present invention, on the basis of the above experimental results, the composition range of the FeNiPd alloy having excellent corrosion resistance is set, in which a saturation magnetic flux density Bs of 1.8 T or more can be ensured.

Figure 8:
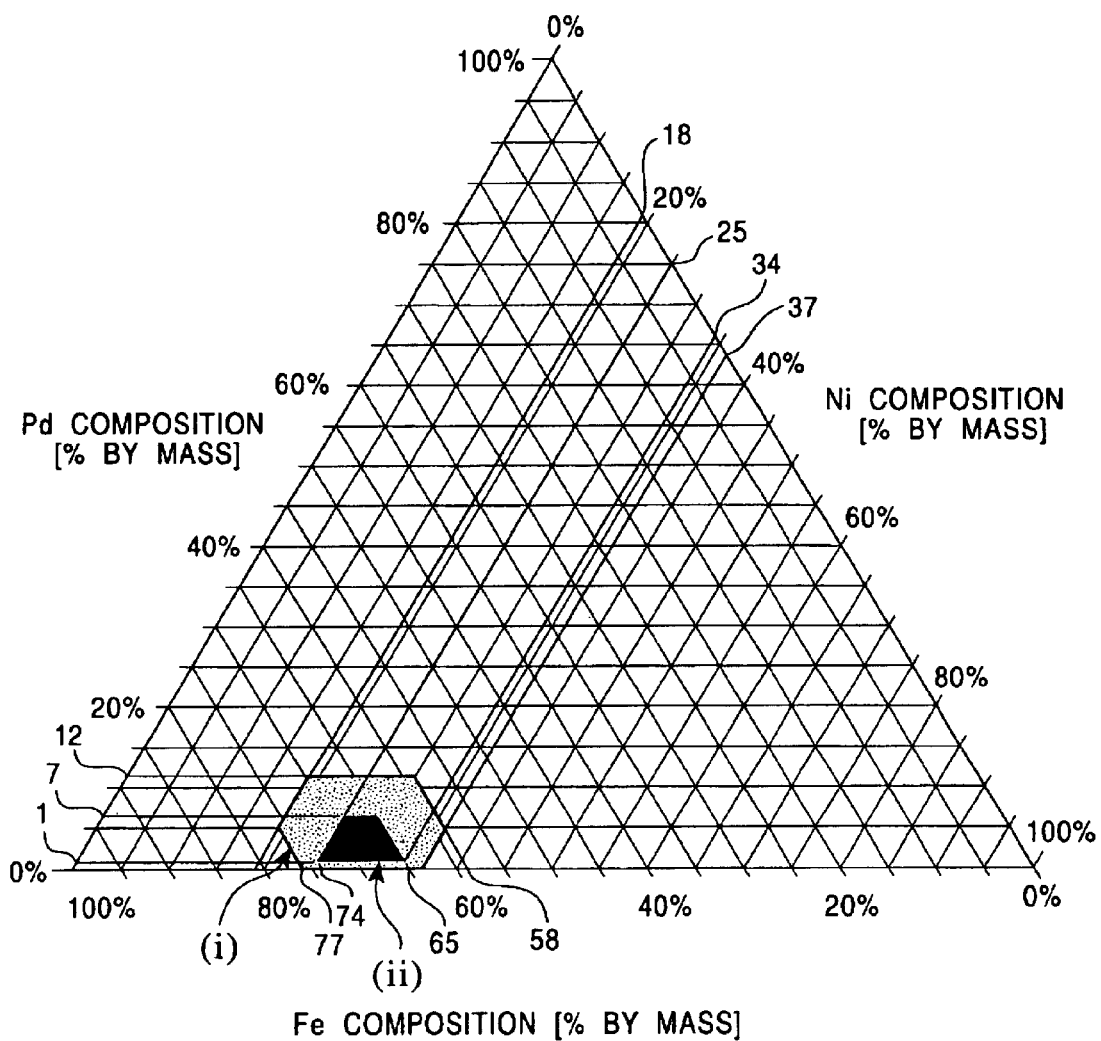
FIG. 8 is a ternary diagram showing a preferred composition range for a FeNiPd alloy.

FIG. 8 is a ternary diagram of the FeNiPd alloy. In this ternary diagram, composition range (i) is set as a preferable composition range for solid plating, in which the Fe composition ratio is 58% by mass to 77% by mass, the Ni composition ratio is 18% by mass to 37% by mass, the Pd composition ratio is 1% by mass to 12% by mass, and the total of the composition ratios of Fe, Ni and Pd is 100% by mass.

All Examples 5 to 13 lie in this composition range. It is found that in all Examples, the saturation magnetic flux density Bs exceeds 1.8 T, and the center line average roughness Rs of the film surface is 10 nm or less. It is thus found that by using the FeNiPd alloy in the composition range (i) shown in FIG. 8, a soft magnetic film having has a high saturation magnetic flux density Bs and excellent corrosion resistance can be formed by plating.

Table 1 indicates that in order to obtain the FeNiPd alloy in the composition range (i), the Fe, Ni and Pd ion concentrations of the plating bath are preferably set to 1.0 g/l to 10 g/l, 5 g/l to 40 g/l, and 0.01 g/l to 0.2 g/l, respectively. The reason for setting lower limit of the Ni concentration to 5 g/l is that with a Ni concentration lower than this value, the stability of the plating bath deteriorates due to an excessively low concentration to fail to form FeNiPd having the desired composition ratios.

The electroplating process uses the pulse current. In use of a noble metal other than Pd, for example, Tc, Ru, Rh, Re, Os, Ir, or Pt, a soft magnetic film having a high saturation magnetic flux density Bs and excellent corrosion resistance can be possibly obtained by using the same plating bath composition as described above.

In the present invention, a soft magnetic film was formed by plating in such a narrow space as the pole portion 18 of the thin film magnetic head shown in FIGS. 2 and 3, and the film characteristics were measured.

In experiment, a resist layer was coated on a substrate, and a trench wad formed in the resist layer by exposure. The trench had a width of about 0.4 $\mu$m, a length of about 0.5 $\mu$m, and a height of about 2.5 $\mu$m.

Then, a soft magnetic film comprising FeNiPd was formed in the trench formed in the resist layer by the electroplating process using a pulse current. Table 3 shows the plating bath compositions used. In experiment, the temperature of the plating bath was about 30° C., the pH of the electrode used was about 3.3, and the current density was about 85 (mA/cm$^2$).

TABLE 3

|  | Fe ion (g/l) | Amount of Ni added (g/l) | Ni ion (g/l) | Amount of PdCl$_2$ (g/l) | Pd ion (g/l) | Rh ion (g/l) | Saccharin sodium (g/l) | Boric acid (g/l) | Sodium chloride (g/l) | Sodium lauryl sulfate (g/l) | Sodium 2-ethylhexyl sulfate (ml/l) |
|---|---|---|---|---|---|---|---|---|---|---|---|
| Comp. Example 3 | 6.0 | 40(1 bath) | 40 | 0 | 0.000 | — | 2 | 25 | 25 | 0.02 | — |
| Example 14 | 6.0 | 40(1 bath) | 40 | 0.03 | 0.018 | — | 2 | 25 | 25 | — | 0.1 |

TABLE 3-continued

|  | Fe ion (g/l) | Amount of Ni added (g/l) | Ni ion (g/l) | Amount of PdCl₂ (g/l) | Pd ion (g/l) | Rh ion (g/l) | Saccharin sodium (g/l) | Boric acid (g/l) | Sodium chloride (g/l) | Sodium lauryl sulfate (g/l) | Sodium 2-ethylhexyl sulfate (ml/l) |
|---|---|---|---|---|---|---|---|---|---|---|---|
| Example 15 | 2.8 | 14(⅓ bath) | 14 | 0.02 | 0.012 | — | 1.5 | 25 | 25 | — | 0.1 |
| Example 16 | 3.8 | 14(⅓ bath) | 14 | 0.03 | 0.018 | — | 1.5 | 25 | 25 | — | 0.1 |
| Example 17 | 1.4 | 10(¼ bath) | 10 | 0.01 | 0.006 | — | 1 | 25 | 25 | — | 0.1 |
| Example 18 | 2.8 | 10(¼ bath) | 10 | 0.03 | 0.018 | — | 1 | 25 | 25 | — | 0.1 |
| Example 19 | 2.3 | 10(¼ bath) | 10 | 0.045 | 0.027 | — | 1 | 25 | 25 | — | 0.1 |
| Example 20 | 2.9 | 10(¼ bath) | 10 | 0.06 | 0.036 | — | 1 | 25 | 25 | — | 0.1 |
| Example 21 | 2.8 | 10(¼ bath) | 10 | 0.07 | 0.042 | — | 1 | 25 | 25 | — | 0.1 |

In Comparative Example 3 and Example 14, the Ni ion concentration of the plating bath was about 40 g/l considered as a reference value. In Examples 15 and 16, the Ni ion concentration was ⅓ of the reference value, and in Examples 17 to 21, the Ni ion concentration was ¼ of the reference value.

The composition ratios, etc. of the soft magnetic films formed by using the plating baths shown in Table 3 were measured. The experimental results are shown in Table 4.

TABLE 4

|  | Composition (% by mass) | | | Corrosion resistance | Saturation magnetic flux density (T) |
|---|---|---|---|---|---|
|  | Fe | Ni | Pd |  |  |
| Comp. Example 3 | 71 | 29 | — | x | 1.9 |
| Example 14 | 72.7 | 24 | 3.3 | ○ | 1.87 |
| Example 15 | 71.1 | 27 | 1.9 | ○ | 1.91 |
| Example 16 | 69.6 | 28 | 2.4 | ○ | 1.90 |
| Example 17 | 66 | 32 | 2 | ○ | 1.85 |
| Example 18 | 68.4 | 29 | 2.6 | ○ | 1.87 |
| Example 19 | 66.5 | 30 | 3.5 | ○ | 1.84 |
| Example 20 | 71 | 27 | 2 | ○ | 1.91 |
| Example 21 | 68 | 28 | 4 | ○ | 1.87 |

Table 4 indicates that the FeNiPd alloys of Examples 14 to 21 have excellent corrosion resistance, as compared with the FeNi alloy of Comparative Example 3. The corrosion resistance of each soft magnetic film was evaluated by a humidity test in which a film was exposed at temperature of 80° C. and a humidity of 90% for 96 hours.

Figure 9:
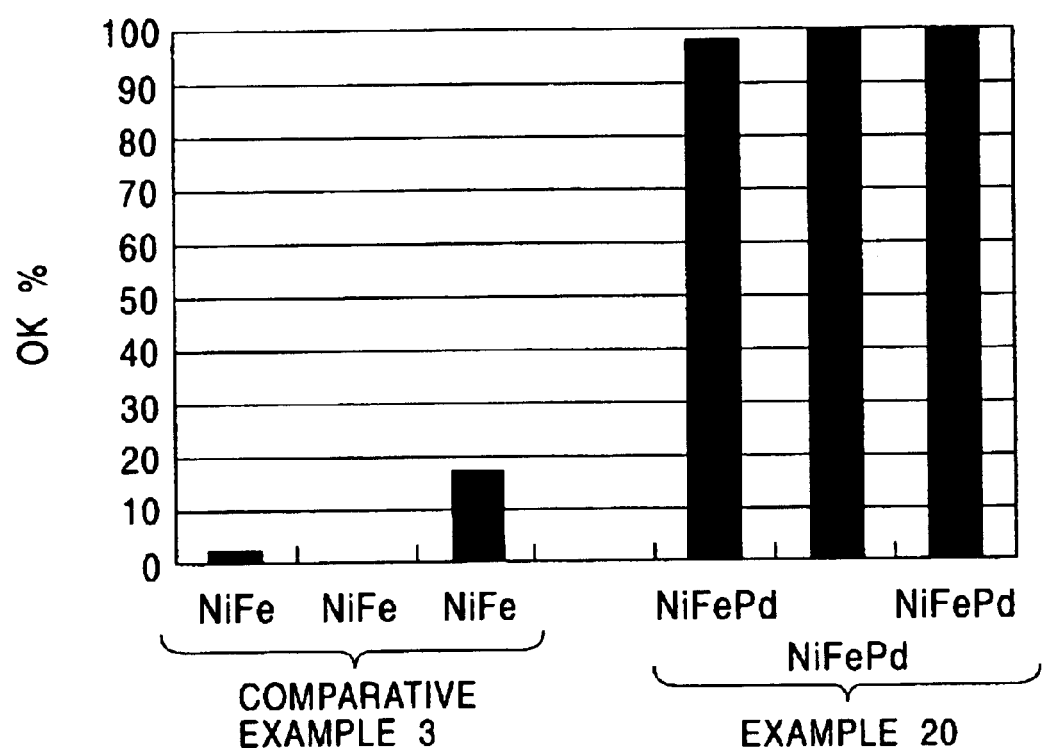
FIG. 9 is a graph showing the ratio of the soft magnetic films not corroded in experiment of corrosion resistance using soft magnetic films of Example 20 and Comparative Example 3.

FIG. 9 shows the experimental results of measurement of the corrosion resistance of the FeNiPd alloy of Example 20 and the FeNi alloy of Comparative Example 3 shown in Table 4. Experiment was carried out by the same humidity test as described above in which a film was exposed at temperature of 80° C. and a humidity of 90% for 96 hours.

In the experiment, three substrates (wafers) were prepared, and several thousands pole layers each comprising the FeNiPd alloy film of Example 20 were formed thereon. Similarly, three substrates (wafers) were prepared, and several thousands pole layers each comprising the FeNi alloy film of Comparative Example 3 were formed thereon. On each of the substrates, 100 each of the NiFePd alloy films and the FeNi alloy films were selected to examine the degree of corrosion of the pole layer comprising each of the selected alloy films. The ratio of the uncorroded pole layers was shown by percentage. The experimental results are shown in FIG. 9.

FIG. 9 indicates that about 100% of the pole layers each comprising the FeNiPd alloy film formed on the three substrates are not corroded, while the ratio of the uncorroded pole layers each comprising the FeNi alloy film is extremely lower than the FeNiPd alloy films.

It is thus found that the FeNiPd alloy film has excellent corrosion resistance, as compared with the FeNi alloy film, and thus use of the FeNiPd alloy for forming a pole layer in a very narrow space can effectively improve the corrosion resistance, as compared with use of the FeNi alloy. Furthermore, with any one of the FeNiPd alloys of Examples 14 to 21 shown in Table 4, the center line average roughness Ra of the film surface is 5 nm or less, and the corrosion resistance is excellent.

As shown in Table 3, in Examples 15 to 21, the Ni ion concentration is 40 g/l or less, and thus the agitating effect of the plating solution can be improved. Therefore, movement (substitution) of Fe ions and element α ions to a surface to be plated can be improved in the narrow space to obtain composition ratios of Fe, Ni and Pd in appropriate ranges.

Furthermore, the experimental results reveal that with any of the FeNiPd alloys of the examples shown in Table 4, a saturation magnetic flux density Bs of 1.9 T or more can be obtained, and the surface roughness can be further decreased, as compared with the alloys shown in Table 2. It is thus found that the FeNiPd alloys shown in Table 4 can be effectively used for the lower pole layer and the upper pole layer of the pole portion 18 formed in the narrow region in narrowing of the track, as shown in FIGS. 2 to 5.

Therefore, a composition range in which the composition ratios of the examples shown in Table 4 lie, i.e., the composition range (ii) shown in the ternary diagram of FIG. 8, is set as a preferable composition range for forming a pole layer, in which the Fe composition ratio is 65% by mass to 74% by mass, the Ni composition ratio is 25% by mass to 34% by mass, the Pd composition ratio is 1% by mass to 7% by mass, and the total composition ratio of Fe, Ni and Pd is 100% by mass.

Table 3 reveals that in order to obtain a FeNiPd alloy in the composition range (ii), the Fe, Ni and Pd ion concentrations of the plating bath are preferably set to 1.0 g/l to 10 g/l, 5 g/l to 15 g/l or 10 g/l or less, and 0.01 g/l to 0.5 g/l, respectively.

In use of a noble metal other than Pd, for example, Tc, Ru, Rh, Re, Os, Ir, or Pt, a soft magnetic film having a high saturation magnetic flux density Bs and excellent corrosion resistance can be possibly formed as a pole layer by using the plating bath composition as described above.

The soft magnetic film according to the first embodiment of the present invention comprises a FeNi alloy containing Pd and element α, wherein the composition ratio of the element α is 1% by mass to 10% by mass.

Such a soft magnetic film is provided with magnetic properties by Ni and Fe, and addition of element α can improve the corrosion resistance, as compared with a soft magnetic film not containing element α and having an Fe composition ratio equivalent to the soft magnetic film of the present invention.

Particularly, with the soft magnetic film according to the second embodiment in which the composition ratio d of Fe is 58% by mass to 77% by mass, the composition ratio e of Ni is 18% by mass to 37% by mass, the composition ratio f of the element α is 1% by mass to 12% by mass, and d+e+f=100% by mass, and the soft magnetic film according to the third embodiment in which the composition ratio X of Fe is 65% by mass to 74% by mass, the composition ratio Y of Ni is 25% by mass to 34% by mass, the composition ratio Z of the element α is 1% by mass to 7% by mass, and X+Y+Z=100% by mass, a higher saturation magnetic flux density Bs can be obtained, and the corrosion resistance is excellent.

The method of producing the soft magnetic film of the first embodiment of the present invention comprises depositing a FeNi alloy containing Pd by the electroplating process, wherein the electroplating process uses a plating bath containing Fe ions and Ni ions, and further containing $PdCl_2$ added thereto in an amount of 0.01 g/l to 0.10 g/l based on the total amount of the plating bath.

The method of producing the soft magnetic film uses the plating bath containing $PdCl_2$ added thereto to produce a soft magnetic film comprising a FeNi alloy containing Pd at a composition ratio of 1% by mass to 10% by mass to and having high corrosion resistance.

The method of producing the soft magnetic film of the present invention may comprise depositing a FeNi alloy containing Rh by the electroplating process, wherein the electroplating process uses a plating bath containing Fe ions and Ni ions, and further containing Rh added thereto by adding a strongly acidic Rh addition solution having a Rh content of 100 g/l in an amount of 0.1 g/l to 0.2 g/l based on the total amount of the plating bath.

The method of producing the soft magnetic film uses the plating bath containing Rh added thereto by adding the strongly acidic Rh addition solution to produce a soft magnetic film comprising a FeNi alloy containing Rh at a composition ratio of 1% by mass to 10% by mass to and having high corrosion resistance.

In the method of producing the soft magnetic film according to the second or third embodiment, the electroplating method using a pulse current is used, and the Ni ion concentration of the plating bath is decreased to improve the agitating effect, thereby easily forming a soft magnetic film having the composition ratios according to the second or third embodiment with high reproducibility.

A thin film magnetic head of the present invention comprises a lower core layer, a gap layer formed on the lower core layer and made of an insulating material, a coil layer formed on the gap layer and made of a good conductive material, an insulating layer formed to cover the coil layer, and an upper core layer formed on the insulating layer, wherein a recording magnetic field is induced in the upper core layer and the lower core layer by the current applied to the coil layer, and at least one of the upper core layer and the lower core layer comprises the soft magnetic film.

In this thin film magnetic head, even when the saturation magnetic flux density Bs is increased by increasing the Fe composition ratio of the soft magnetic film of the core layer, the corrosion resistance of the soft magnetic film does not deteriorate, thereby making the thin film magnetic head adaptable to a higher recording density while maintaining the corrosion resistance of the lower core layer and/or the upper core layer.

Particularly, in a thin film magnetic head comprising a pole portion with a track width formed between a lower core layer and an upper core layer, the use of the soft magnetic film of the third embodiment as a lower pole layer and/or an upper pole layer which constitutes the pole portion can facilitate the manufacture of a thin film magnetic head adaptable to a higher recording density and having excellent corrosion resistance with high reproducibility.

What is claimed is:

1. A soft magnetic film represented by the composition formula $Fe_dNi_e\alpha_f$ (wherein element α is at least one of Tc, Ru, Rh, Pd, Re, Os, Ir and Pt), wherein the composition ratio d of Fe is 58% by mass to 77% by mass, the composition ratio e of Ni 18% by mass to 37% by mass, the composition ratio f of the element α is 1% by mass to 12% by mass, and d+e+f=100% by mass.

2. A soft magnetic film represented by the formula $Fe_XNi_Y\alpha_Z$ (wherein element α is at least one of Tc, Ru, Rh, Pd, Re, Os, Ir and Pt), wherein the composition ratio X of Fe is 65% by mass to 74% by mass, the composition ratio Y of Ni 25% by mass to 34% by mass, the composition ratio Z of the element α is 1% by mass to 7% by mass, and X+Y+Z=100% by mass.

3. A thin film magnetic head comprising a lower core layer made of a magnetic material, a gap layer formed on the lower core layer and made of an insulating material, a coil layer formed on the gap layer and made of a good conductive material, an insulating layer covering the coil layer, and an upper core layer formed on the insulating layer;
wherein at least one of the upper core and the lower core layer comprises a soft magnetic film according to claim 1.

4. A thin film magnetic head according to claim 3, further comprising a lower pole layer formed on the lower core layer to protrude from a surface facing a recording medium, wherein the lower pole layer comprises a soft magnetic film according to claim 1.

5. A thin film magnetic film comprising a lower core layer, an upper core layer, and a pole portion located between the lower core layer and the upper core layer and having a width dimension in the track width direction, which is restricted to be shorter than the lower core layer and the upper core layer;
wherein the pole portion comprises a lower pole layer continued from the lower core layer, an upper pole layer continued from the upper core layer, and a gap layer located between the lower pole layer and the upper pole layer, or the pole portion comprises an upper pole layer continued from the upper core layer and a gap layer located between the upper pole layer and the lower core layer; and
the upper pole layer and/or the lower pole layer comprises a soft magnetic film according to claim 1.

6. A thin film magnetic head according to claim 3, wherein at least the portion of the core layer, which is adjacent to the magnetic gap, comprises at least two magnetic layers, or the pole layer comprises at least two magnetic layers, and the magnetic layer of the at least two magnetic layers, which contacts the magnetic gap, comprises a soft magnetic film according to claim 1.

7. A thin film magnetic head comprising a lower core layer made of a magnetic material, a gap layer formed on the lower core layer and made of an insulating material, a coil layer formed on the gap layer and made of a good conductive material, an insulating layer covering the coil layer, and an upper core layer formed on the insulating layer;

wherein at least one of the upper core layer and the lower core layer comprises a soft magnetic film according to claim 2.

8. A thin film magnetic head according to claim 7, further comprising a lower pole layer formed on the lower core layer to protrude from a surface facing a recording medium, wherein the lower pole layer comprises a soft magnetic film according to claim 2.

9. A thin film magnetic film comprising a lower core layer, an upper core layer, and a pole portion located between the lower core layer and the upper core layer and having a width dimension in the track width direction, which is restricted to be shorter than the lower core layer and the upper core layer;

wherein the pole portion comprises a lower pole layer continued from the lower core layer, an upper pole layer continued from the upper core layer, and a gap layer located between the lower pole layer and the upper pole layer, or the pole portion comprises an upper pole layer continued from the upper core layer and a gap layer located between the upper pole layer and the lower core layer; and the upper pole layer and/or the lower pole layer comprises a soft magnetic film according to claim 2.

10. A thin film magnetic head according to claim 7, wherein at least the portion of the core layer, which is adjacent to the magnetic gap, comprises at least two magnetic layers, or the pole layer comprises at least two magnetic layers, and the magnetic layer of the at least two magnetic layers, which contacts the magnetic gap, comprises a soft magnetic film according to claim 2.

* * * * *

UNITED STATES PATENT AND TRADEMARK OFFICE
CERTIFICATE OF CORRECTION

PATENT NO.   : 6,898,054 B2
DATED        : May 24, 2005
INVENTOR(S)  : Mitsuo Kawasaki et al.

It is certified that error appears in the above-identified patent and that said Letters Patent is hereby corrected as shown below:

Column 30,
Line 32, after "the upper core" insert -- layer --.

Signed and Sealed this

Twenty-ninth Day of November, 2005

JON W. DUDAS
*Director of the United States Patent and Trademark Office*